(12) United States Patent
Hattori

(10) Patent No.: US 7,720,277 B2
(45) Date of Patent: May 18, 2010

(54) THREE-DIMENSIONAL-INFORMATION RECONSTRUCTING APPARATUS, METHOD AND PROGRAM

(75) Inventor: Hiroshi Hattori, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 796 days.

(21) Appl. No.: 11/198,215

(22) Filed: Aug. 8, 2005

(65) Prior Publication Data

US 2006/0050338 A1    Mar. 9, 2006

(30) Foreign Application Priority Data

| Aug. 9, 2004 | (JP) | ............................. 2004-232220 |
| Jan. 12, 2005 | (JP) | ............................. 2005-005649 |
| May 26, 2005 | (JP) | ............................. 2005-153965 |

(51) Int. Cl.
*G06K 9/00* (2006.01)

(52) U.S. Cl. ...................................... 382/154; 382/104

(58) Field of Classification Search ................... 382/154
See application file for complete search history.

(56) References Cited

U.S. PATENT DOCUMENTS

| 4,924,506 | A | * | 5/1990 | Crossley et al. ............. 382/286 |
| 5,825,915 | A | * | 10/1998 | Michimoto et al. ......... 382/154 |
| 5,910,817 | A | * | 6/1999 | Ohashi et al. ................ 348/159 |
| 5,956,418 | A | * | 9/1999 | Aiger et al. .................. 382/154 |
| 6,141,440 | A | * | 10/2000 | Melen ........................ 382/154 |
| 6,201,541 | B1 | * | 3/2001 | Shalom et al. ............... 345/419 |
| 6,215,898 | B1 | * | 4/2001 | Woodfill et al. ............. 382/154 |
| 6,269,175 | B1 | * | 7/2001 | Hanna et al. ................ 382/107 |
| 6,519,358 | B1 | * | 2/2003 | Yokoyama et al. .......... 382/154 |
| 6,606,406 | B1 | * | 8/2003 | Zhang et al. ................ 382/154 |

(Continued)

FOREIGN PATENT DOCUMENTS

JP        8-178795        7/1996

(Continued)

OTHER PUBLICATIONS

T. Kanade and M. Okutomi, "A Stereo Matching Algorithm with an Adaptive Window: Theory and Experiment," Proceedings of the 1991 IEEE International Conference on Robotics and Automation (ICRA '91), Apr. 1991, pp. 1088-1095.*

(Continued)

*Primary Examiner*—Sath V Perungavoor
(74) *Attorney, Agent, or Firm*—Oblon, Spivak, McClelland, Maier & Neustadt, L.L.P.

(57) ABSTRACT

Apparatus includes unit configured to compute parallax search range in (x-y-d) three-dimensional space formed of three variables (x and y providing first point (x, y) on first image and parallax candidate d), similarity unit configured to compute degree-of-similarity C (x, y, d) between point (x, y) and second point (x', y') corresponding to point (x, y), using sum of products of brightness levels of corresponding pixel pairs between first window on first image and second window on second image, first window including first point (x, y) second window including second point (x', y') and unit configured to compute parallax D between first point (x, y) and second point (x', y'), based on C (x, y, d), where similarity unit includes unit configured to store sum, which is used for computing C (x, y, d) between new first point on first image and new second point on second image.

12 Claims, 16 Drawing Sheets

U.S. PATENT DOCUMENTS

| | | | |
|---|---|---|---|
| 6,658,149 B1 * | 12/2003 | Wakahara et al. | 382/215 |
| 6,677,941 B2 * | 1/2004 | Lin | 345/419 |
| 6,906,620 B2 | 6/2005 | Nakai et al. | |
| 7,046,822 B1 * | 5/2006 | Knoeppel et al. | 382/103 |
| 7,103,212 B2 * | 9/2006 | Hager et al. | 382/154 |
| 2001/0019621 A1 * | 9/2001 | Hanna et al. | 382/107 |
| 2001/0036307 A1 * | 11/2001 | Hanna et al. | 382/154 |
| 2002/0024516 A1 * | 2/2002 | Chen et al. | 345/419 |
| 2003/0190072 A1 * | 10/2003 | Adkins et al. | 382/154 |
| 2004/0136567 A1 * | 7/2004 | Billinghurst et al. | 382/103 |
| 2005/0196034 A1 * | 9/2005 | Hattori et al. | 382/154 |
| 2006/0050338 A1 * | 3/2006 | Hattori | 359/9 |
| 2008/0002878 A1 * | 1/2008 | Meiyappan | 382/154 |
| 2008/0239116 A1 * | 10/2008 | Smith | 348/250 |

FOREIGN PATENT DOCUMENTS

| | | |
|---|---|---|
| JP | 11-161792 | 6/1999 |
| JP | 11-264724 | 9/1999 |
| JP | 2001-194126 | 7/2001 |
| JP | 2002-163639 | 6/2002 |
| JP | 2002-358595 | 12/2002 |

OTHER PUBLICATIONS

Asada, "Understanding of Dynamic Scene", Institute of Electronics, Information and Communications Engineering, pp. 12-15, 2005.

Changming Sun, "A Fast Stereo Matching Method", Digital Image Computing: Techniques and Applications, 1997, pp. 95-100.

D. Koller, et al. "Using Binocular Stereopsis for Vision-Based Vehicle Control", Intelligent Vehicles Symposium, 1994, pp. 237-242.

Olga Veksler, "Fast Variable Window for Stereo Correspondence Using Integral Images", Conference on Computer Vision and Pattern Recognition, 2003, vol. I, pp. 556-561.

Noriaki Maru, et al., "Adaptive Disparity Detection in Binocular Vision", Memoir of Japan Robot Association, Japan robot Association, vol. 9, No. 3, Jun. 15, 1991, pp. 27-34.

* cited by examiner

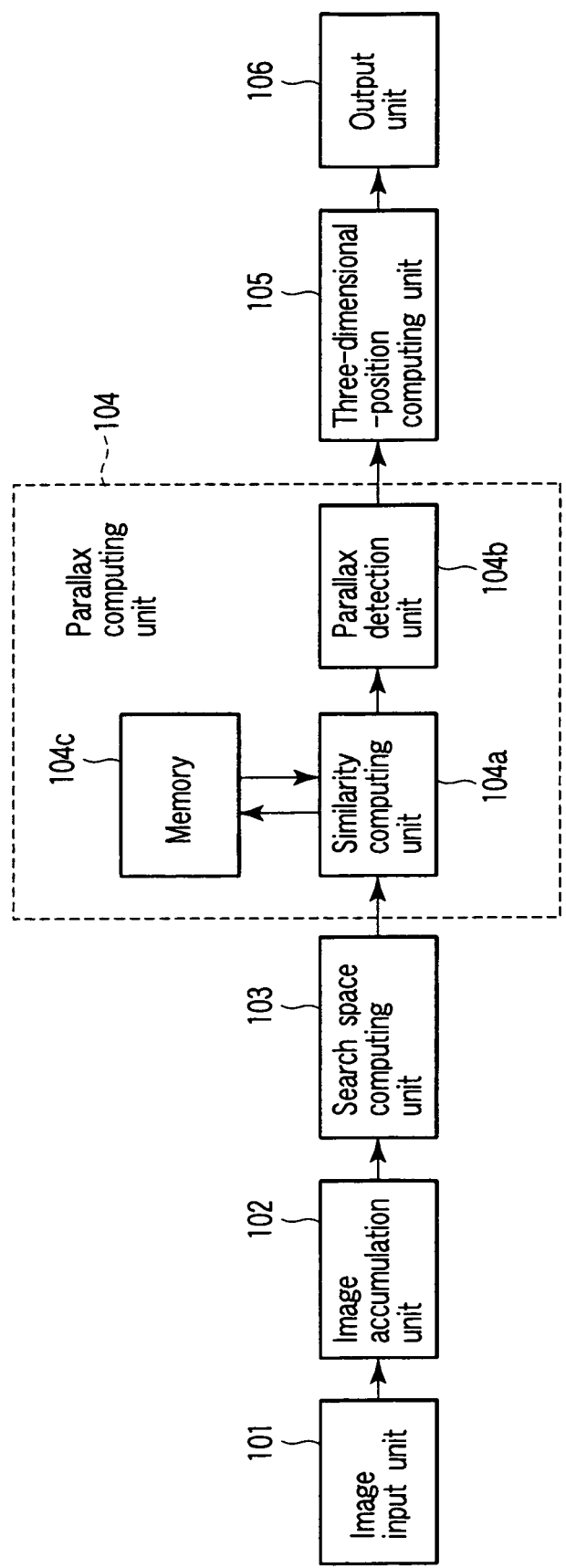
F I G. 1

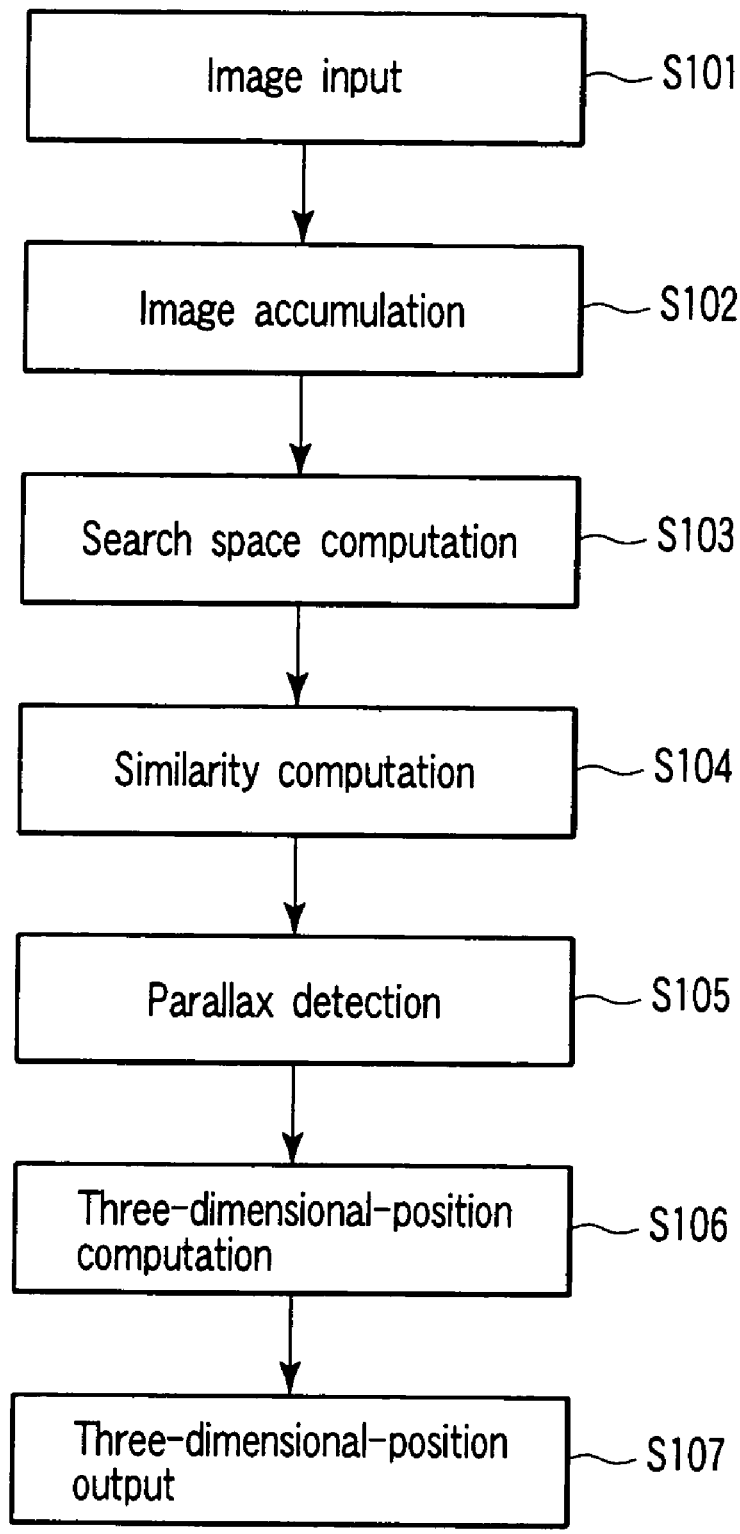
F I G. 2

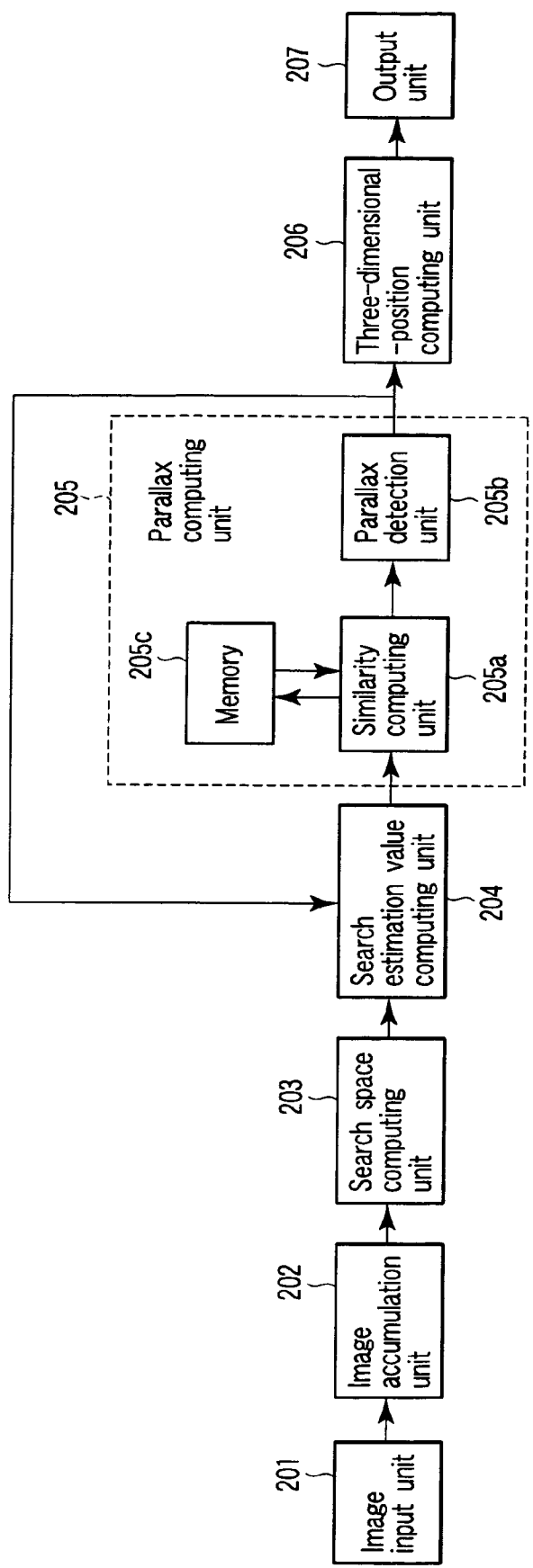
F I G. 14

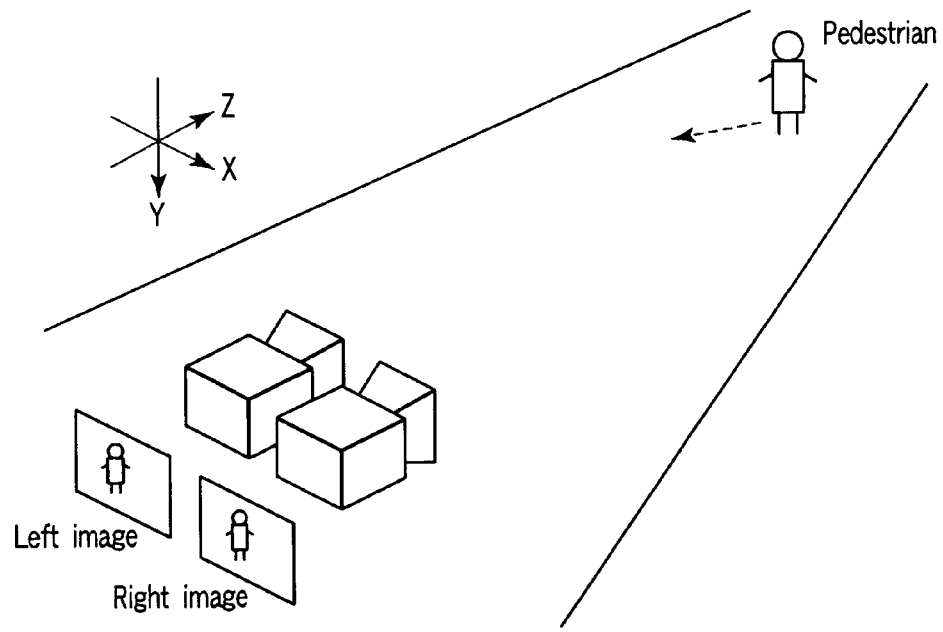
F I G. 1 5
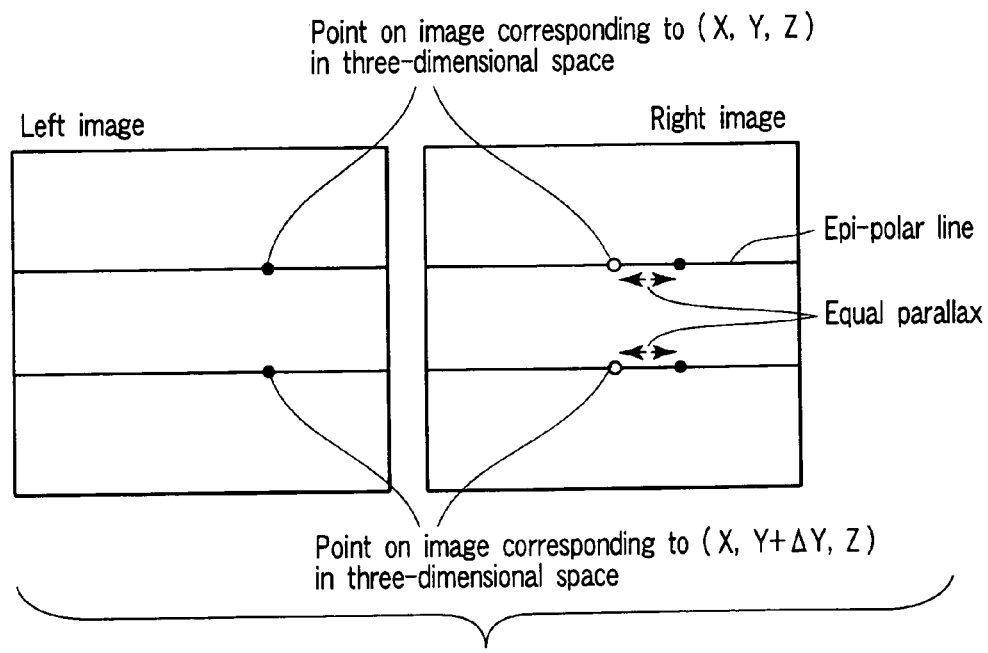
F I G. 1 6

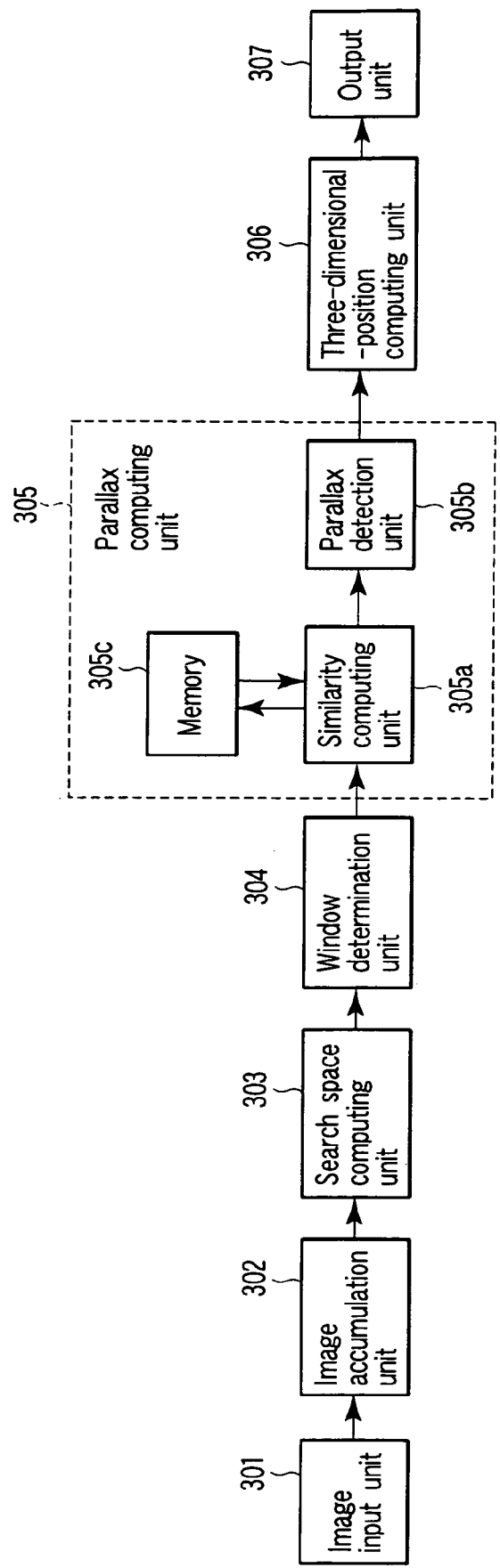
F I G. 2 0

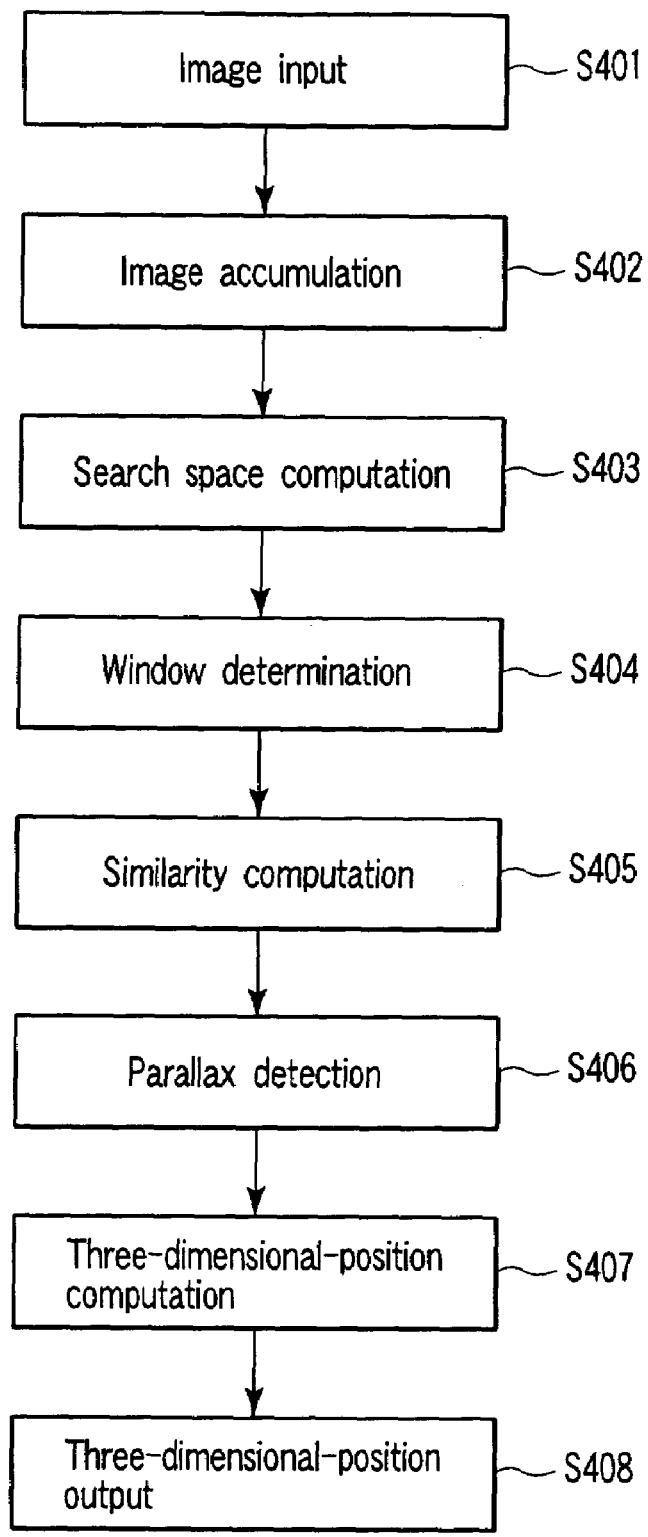
F I G. 21

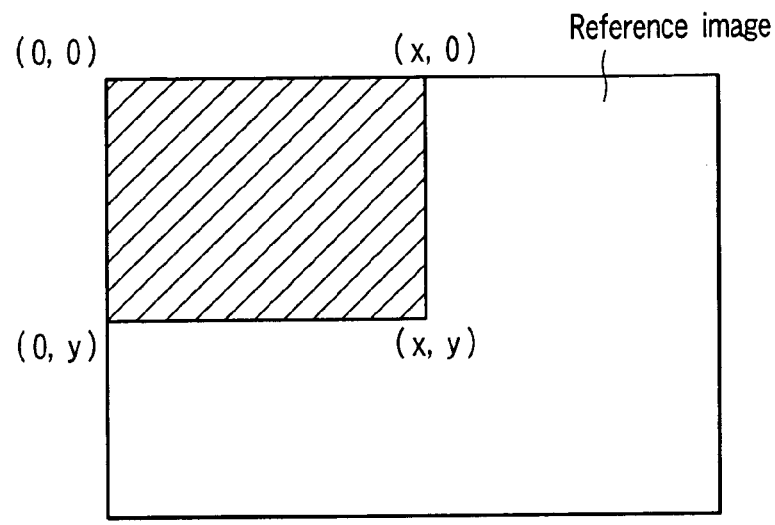
F I G. 24
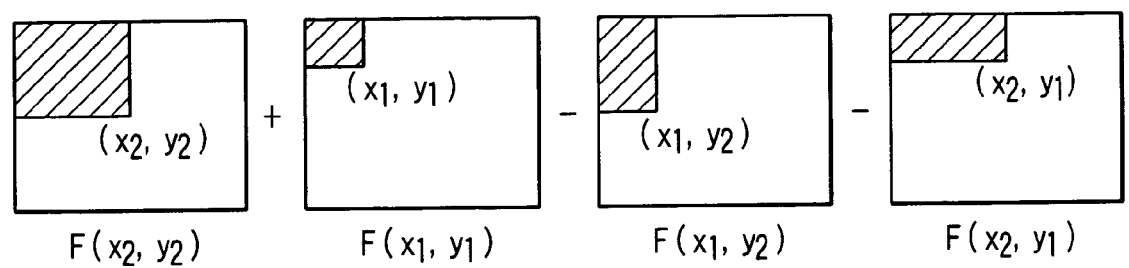
F I G. 25

THREE-DIMENSIONAL-INFORMATION RECONSTRUCTING APPARATUS, METHOD AND PROGRAM

CROSS-REFERENCE TO RELATED APPLICATIONS

This application is based upon and claims the benefit of priority from prior Japanese Patent Applications No. 2004-232220, filed Aug. 9, 2004; No. 2005-005649, filed Jan. 12, 2005; and No. 2005-153965, filed May 26, 2005, the entire contents of all of which are incorporated herein by reference.

BACKGROUND OF THE INVENTION

1. Field of the Invention

The present invention relates to a three-dimensional-information reconstructing apparatus and method, and more particularly, to a three-dimensional-information reconstructing apparatus, method and program for reconstructing three-dimensional information, such as the three-dimensional configuration of an object or the distance to an object, by acquiring the parallax between images captured by a plurality of photographing means.

2. Description of the Related Art

Three-dimensional-information reconstructing techniques for measuring the three-dimensional configuration of an object or the three-dimensional position of an obstacle have been developed so far as techniques indispensable for realization of auto-working robots or auto-running vehicles. In particular, three-dimensional-information reconstructing apparatuses, which reconstruct three-dimensional information concerning a target space, based on stereoscopic views captured by a plurality of TV cameras, have been widely utilized since they provide images of high resolution, they are superior in measuring accuracy, and they are inexpensive.

For instance, Jpn. Pat. Appln. KOKAI Publication No. 2002-163639 discloses, at page 7 and in FIG. 4, a method for limiting the range of searches utilizing the fact that an object is positioned on or above a reference plane (e.g., a road or floor) appearing in each captured image, thereby realizing high-rate three-dimensional information reconstruction. This method is known as a method for reconstructing three-dimensional information from the parallax between an arbitrary projected point on a reference image selected from images captured by a plurality of cameras, and the corresponding projected point on each of the other images.

To search images for accurately corresponding points thereon, it is necessary to prevent occurrence of erroneous correspondence between a certain projected point and a projected point having a brightness pattern similar to that of the really corresponding projected point. To this end, it is necessary to set a large window for computing the degree of similarity. However, no sufficient studies have yet been performed on a method for reconstructing three-dimensional information at high speed by efficiently computing the degree of similarity.

Further, to apply the above-described technique to auto-working robots or auto-running vehicles, a function for receiving still image data from a plurality of cameras in a time-series manner, and performing real-time reconstruction of three-dimensional information is required. However, no sufficient studies have yet been performed on a three-dimensional-information reconstructing apparatus capable of such real-time processing.

As described above, there are no conventional three-dimensional-information reconstructing apparatuses that efficiently compute the degree of similarity between a projected point on a reference image and the corresponding projected point on another image.

Also, there are no conventional three-dimensional-information reconstructing apparatuses that perform real-time processing of still image data sent from cameras in a time-series manner, thereby reconstructing three-dimensional information.

BRIEF SUMMARY OF THE INVENTION

In accordance with a first aspect of the invention, there is provided a three-dimensional-information reconstructing apparatus comprises a camera that capture an object in a three-dimensional space to acquire a first image of the object and a second image of the object; a search range computing unit configured to compute, based on a geometrical relationship between the object and a reference plane in the three-dimensional space, a parallax search range in a (x-y-d) three-dimensional space formed of three variables, the three variables being an x value and a y value providing a first point (x, y) on the first image and a parallax candidate d; a similarity estimator which estimates, for each of parallax candidates in the parallax search range, a degree-of-similarity C (x, y, d) between the first point (x, y) and a second point (x', y') on the second image, the second point (x', y') corresponding to the first point (x, y), the degree-of-similarity C (x, y, d) being based on a sum of products of brightness levels of corresponding pixel pairs between a first window on the first image and a second window on the second image, the first window including the first point (x, y), the second window including the second point (x', y') and having a size identical to a size of the first window; and a parallax computing unit configured to compute a parallax D between the first point (x, y) on the first image and the second point (x', y') on the second image, based on the degree-of-similarity C (x, y, d), wherein: the similarity computing unit includes a storage unit configured to store the sum, the stored sum being used for computing a degree-of-similarity C (x, y, d) between a new first point on the first image and a new second point on the second image corresponding to the new first point.

In accordance with a second aspect of the invention, there is provided a three-dimensional-information reconstructing method comprising: capturing an object in a three-dimensional space to acquire a first image of the object and a second image of the object; computing, based on a geometrical relationship between the object and a reference plane in the three-dimensional space, a parallax search range in a (x-y-d) three-dimensional space formed of three variables, the three variables being an x value and a y value providing a first point (x, y) on the first image and a parallax candidate d; estimating, for each of parallax candidates in the parallax search range, a degree-of-similarity C (x, y, d) between the first point (x, y) and a second point (x', y') corresponding to the first point (x, y), the degree-of-similarity C (x, y, d) being based on a sum of products of brightness levels of corresponding pixel pairs between a first window on the first image and a second window on the second image, the first window including the first point (x, y), the second window including the second point (x', y') and having a size identical to a size of the first window; and computing a parallax D between the first point (x, y) on the first image and the second point (x', y') on the second image, based on the degree-of-similarity C (x, y, d), wherein: computing the degree-of-similarity includes storing the sum, the stored sum being used for computing a degree-of-similarity C (x, y, d) between a new first point on the first image and a new second point on the second image corresponding to the new first point.

In accordance with a third aspect of the invention, there is provided a three-dimensional-information reconstructing program stored in a medium which is read by a computer, the program comprising instructions of: capturing an object in a three-dimensional space to acquire a first image of the object and second image of the object; computing, based on a geometrical relationship between the object and a reference plane in the three-dimensional space, a parallax search range in a (x-y-d) three-dimensional space formed of three variables, the three variables being an x value and a y value providing a first point (x, y) on the first image and a parallax candidate d; estimating, for each of parallax candidates in the parallax search range, a degree-of-similarity C (x, y, d) between the first point (x, y) and a second point (x', y') on the second image, the second point (x', y') corresponding to the first point (x, y), the degree-of-similarity C (x, y, d) being based on a sum of products of brightness levels of corresponding pixel pairs between a first window on the first image and a second window on the second image, the first window including first point (x, y), the second window including the second point (x', y') and having a size identical to a size of the first window; and computing a parallax D between the first point (x, y) on the first image and the second point (x', y') on the second image, based on the degree-of-similarity C (x, y, d), wherein: the degree-of-similarity computing instruction includes an instruction of instructing the computer to store the sum, the stored sum being used for computing a degree-of-similarity C (x, y, d) between a new first point on the first image and a new second point on the second image corresponding to the new first point.

BRIEF DESCRIPTION OF THE SEVERAL VIEWS OF THE DRAWING

FIG. 1 is a block diagram illustrating the configuration of a three-dimensional-information reconstructing apparatus according to a first embodiment of the invention;

FIG. 2 is a flowchart illustrating the operation of the first embodiment;

FIG. 14 is a block diagram illustrating the configuration of a three-dimensional-information reconstructing apparatus according to a second embodiment of the invention;

FIG. 15 is a view illustrating the relationship between a stereo camera and a pedestrian, used in the second embodiment;

FIG. 16 is a view illustrating the relationship between points in three-dimensional space, which have the same parallax;

FIG. 20 is a block diagram illustrating the configuration of a three-dimensional-information reconstructing apparatus according to a third embodiment of the invention;

FIG. 21 is a flowchart illustrating the operation of the third embodiment;

FIG. 24 is a view useful in explaining a method employed in the fourth embodiment for acquiring the sum of brightness levels in an arbitrary image region; and FIG. 25 is a view useful in explaining another method employed in the fourth embodiment for acquiring the sum of brightness levels in an arbitrary image region.

DETAILED DESCRIPTION OF THE INVENTION

Embodiments of the invention will be described in detail.

In the embodiments, a three-dimensional-information reconstructing apparatus, method and program that realize high-speed reconstruction of three-dimensional information are provided. In these apparatus, method and program, the degree of similarity between corresponding projected points on a new reference image and a new image is computed in relation to an arbitrary parallax candidate, using the sum of products of the brightness levels of corresponding pixels on a reference image and another image, which is previously computed and stored in a memory.

In the embodiments, a three-dimensional-information reconstructing apparatus, method and program that realize high-speed reconstruction of three-dimensional information by setting the accuracy of a parallax search based on three-dimensional information reconstructed from already acquired images are also provided.

In the embodiment, the sum of products of the brightness levels of corresponding pixels on a reference image and another image is beforehand computed and stored in a memory, and is utilized to compute, for an arbitrary parallax candidate, the degree of similarity between corresponding projected points on a new reference image and a new image. As a result, high-speed reconstruction of three-dimensional information can be realized.

Figure 3:
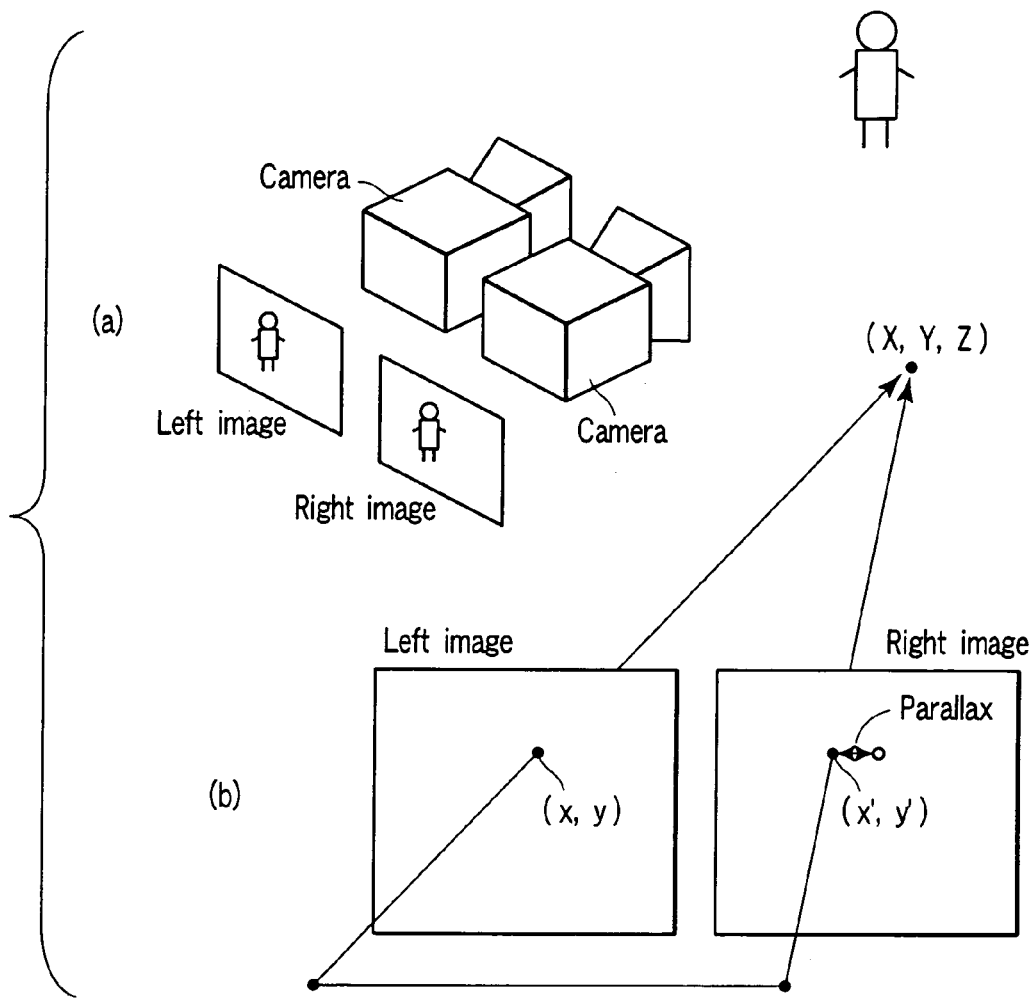
FIG. 3 is a view useful in explaining a method for reconstructing three-dimensional information utilizing stereoscopic views.

Referring first to FIG. 3, a brief description will be given of a three-dimensional-information reconstructing method based on stereoscopic views. For facilitating the description, assume that two cameras are positioned at the right and left sides to capture an object in three-dimensional space as shown in (a) of FIG. 3, and the position (X, Y, Z) of the object is determined from image information acquired from the right and left cameras.

When an object in three-dimensional space is captured by the cameras positioned at the right and left sides as shown in (a) of FIG. 3, each point in the object is projected onto different points of the right and left images captured from the two cameras as shown in (b) of FIG. 3. Such a displacement in projected point between images is called a parallax. The parallax between projected points on the right and left images varies, depending upon the position of a point in three-dimensional space to be projected. Therefore, if a certain projected point corresponding to a projected point on one (i.e., reference image) of the images is searched for on the other image, and the parallax between these projected points is computed, a position (X, Y, Z) in three-dimensional space corresponding to the certain projected point on the reference image can be acquired utilizing the principle of triangular surveying. Similarly, positions in three-dimensional space corresponding to all projected points on the reference image are computed. As a result, an object in three-dimensional space is reconstructed.

Figure 4:
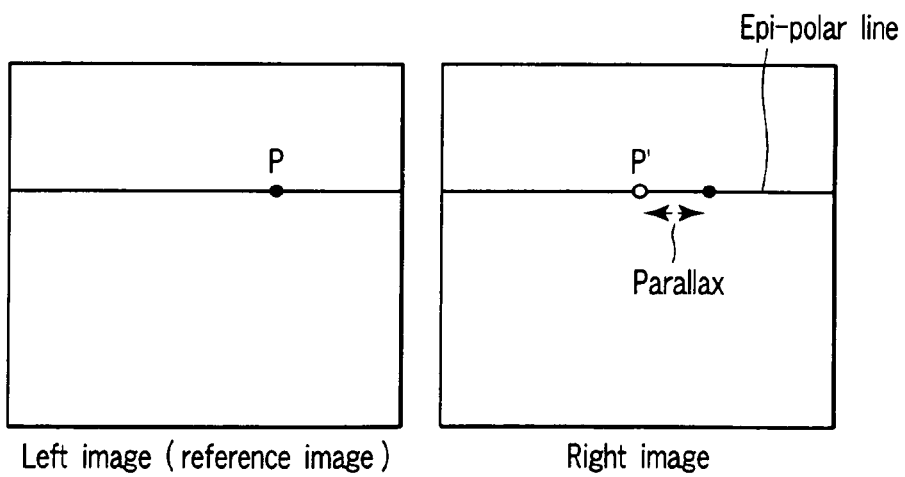
FIG. 4 is a view showing the relationship between the epipolar line and parallax.

As described above, to acquire a position (X, Y, Z) in three-dimensional space corresponding to each projected point on the reference image, firstly, it is necessary to search for a projected point on the other image corresponding to that on the reference image, and compute the parallax therebetween. On a stereographic image, assuming that a left image from the left camera is a reference image as shown in FIG. 4, a projected point P' on a right image from the right camera corresponding to a projected point P on the reference image is on the line, called an epipolar line, shown in FIG. 4. Accordingly, three-dimensional information concerning an arbitrary point on the reference image can be reconstructed by searching for a projected point (P') on the epipolar line corresponding to the arbitrary point (P), and computing the parallax therebetween.

Figure 5:
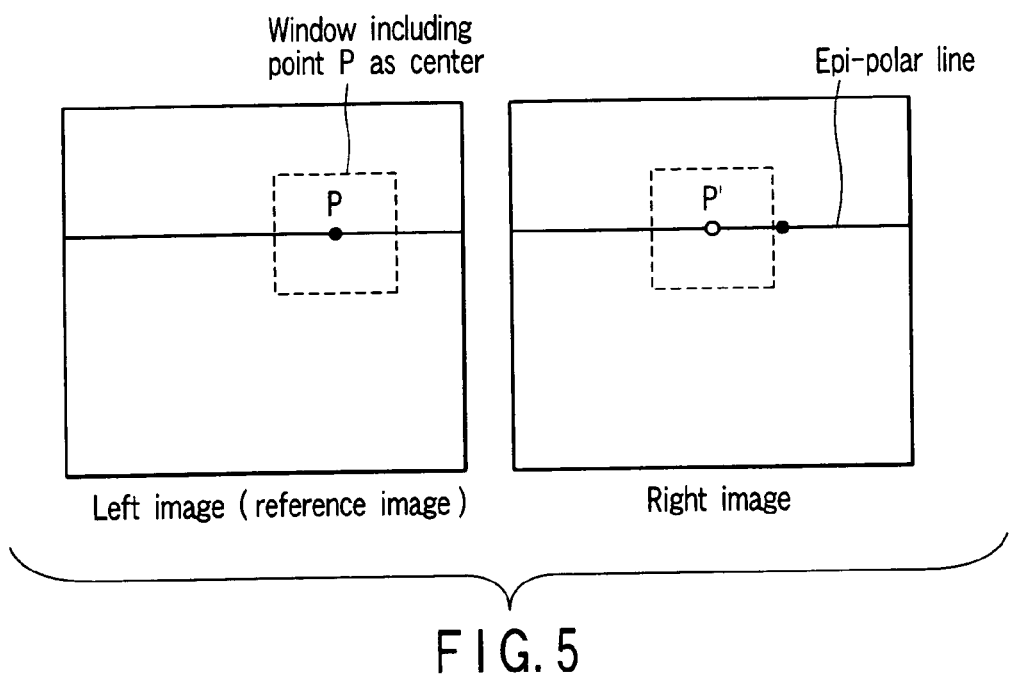
FIG. 5 is a view illustrating windows used to compute the degree of similarity between projected points.

The projected point P' on the other (right) image corresponding to the projected point P on the reference (left) image can be detected by computing the degree of similarity between the projected point P and each projected point on the epipolar line on the right image, and detecting the point on the epipolar line that has the maximum similarity with respect to the projected point p. More specifically, as shown in FIG. 5, the degree of similarity is detected between the brightness of each pixel contained in a certain range (window) including the projected point P as the center of the window, and the brightness of each pixel contained in a window including each point on the epipolar line as the center of the window. The projected point P' that has the maximum similarity is determined to be the corresponding projected point.

First Embodiment

FIG. 1 is a block diagram illustrating a three-dimensional-information reconstructing apparatus according to a first embodiment of the invention. As shown, the three-dimensional-information reconstructing apparatus comprises an image input unit 101, image accumulation unit 102, search space computing unit 103, parallax computing unit 104, three-dimensional-position computing unit 105 and output unit 106. The parallax computing unit 104 comprises a similarity computing unit 104a, parallax detection unit 104b and memory 104c.

Figure 6:
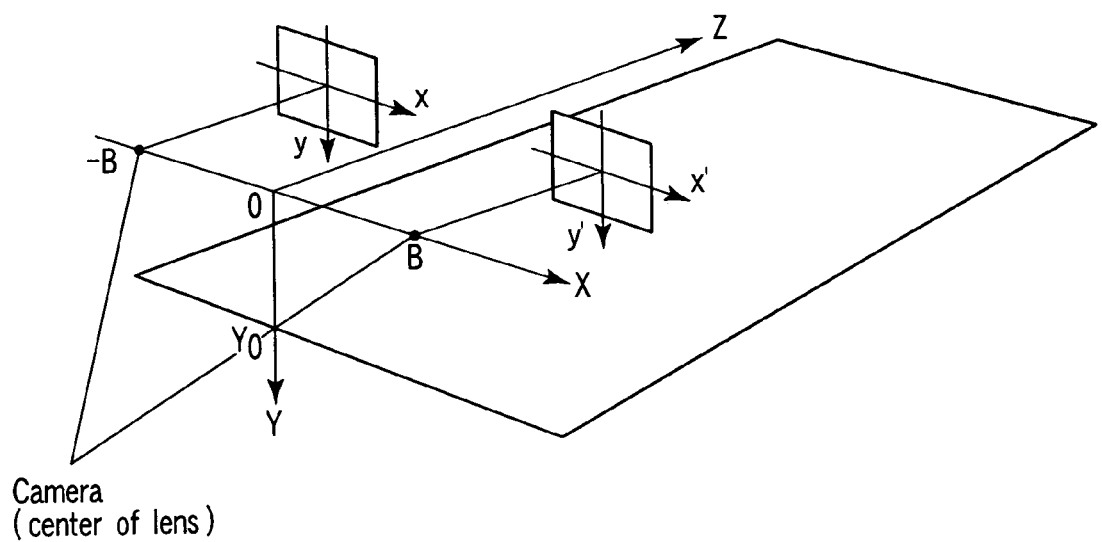
FIG. 6 is a view illustrating the relationship between a stereo camera and reference plane employed in the first embodiment.

The image input unit 101 is formed of a plurality of cameras having a function for capturing an object existing in three-dimensional space. For simplifying the description, assume here that the image input unit 101 is formed of two cameras located on the right and left sides in parallel with each other, as shown in FIG. 6. Namely, the central point of each of the lenses of the right and left cameras is set as the origin of the three-dimensional coordinate system. The epipolar line connecting the central points of the lenses to each other is set as X-axis. The epipolar line perpendicular to X-axis is set as Y-axis (the downward direction is set as the positive direction). Further, the direction of the optical axis of the cameras is set as Z-axis. In this case, assume that the positions of the left and right cameras can be expressed as (−B, 0, 0) and (B, 0, 0), respectively. Also assume that, on this three-dimensional coordinate system, a reference plane, such as a road or a floor, is expressed as $Y=Y_0$.

The image accumulation unit 102 has a function for storing image data acquired by the image input unit 101, and is formed of a semiconductor memory, hard disk, CD-R, CD-RW, DVD-R, or DVD-RAM, etc.

The search space computing unit 103 has a function for computing a parallax search range from a plurality of image data items accumulated in the image accumulation unit 102.

The parallax computing unit 104 comprises a similarity computing unit 104a, parallax detection unit 104b and memory 104c. The similarity computing unit 104a has a function for computing, in relation to each of all parallax candidates d, the degree of similarity between a projected point (x, y) on a left image sent from a left (first) camera, and the corresponding projected point (x', y') on a right image sent from a right (second) camera. The left image will hereinafter be referred to as "the reference image", and the right image will hereinafter referred to "the other image". The parallax detection unit 104b has a function for detecting the parallax between a projected point on the reference image and the corresponding projected point on the other image, based on the degree of similarity therebetween computed by the similarity computing unit 104a. The memory 104c has a function for storing the sum of the products of the brightness levels of pairs of corresponding pixels on the reference image and the other image.

The three-dimensional-position computing unit 105 has a function for computing the position of, for example, an object in three-dimensional space captured by the cameras, based on the parallax computed by the parallax computing unit 104.

The output unit 106 has a function for displaying the three-dimensional position of, for example, an object computed by the three-dimensional-position computing unit 105. The unit 106 is formed of, for example, a CRT display or liquid crystal display.

Referring to FIGS. 1 and 2, the operation of the three-dimensional-information reconstructing apparatus according the first embodiment will be described. FIG. 2 is a flowchart illustrating the operation.

Firstly, the image input unit 101 acquires images of, for example, a three-dimensional object using the right and left cameras, and sends them to the image accumulation unit 102 (Step S101).

The images sent from the image input unit 101 are accumulated in the image accumulation unit 102 (step S102).

The search space computing unit 103 utilizes the fact that the three-dimensional object exists on or above the reference plane, to compute the parallax search range from the image data stored in the image accumulation unit 102 (step S103). A method for determining the parallax search range using the right and left cameras will now be described.

Assume that projected points on the right and left images corresponding to the position (X, Y, Z) in three-dimensional space shown in FIG. 6 are expressed as (x, y) and (x', y'), respectively, and that the focal distance of the lenses is F. In this case, the following equations are established:

$$x = F\frac{X+B}{Z} \quad (1)$$

$$x' = F\frac{X-B}{Z}$$

$$y = y' = F\frac{Y}{Z}$$

In this embodiment, the two cameras are located at the right and left sides in parallel with each other, therefore the epipolar line on the other image corresponding to an arbitrary projected point on the reference image is assumed to be y=y'.

If X, Y and Z are derived from the above equations, the following equations are established:

$$X = \frac{B}{d}(x+x') \quad (2)$$

$$Y = \frac{2B}{d}y = \frac{2B}{d}y'$$

$$Z = \frac{2BF}{d}$$

where d=x−x', and d represents a displacement in display position between the corresponding projected points on the right and left images, i.e., a parallax candidate. Further, since the three-dimensional object exists in front of the cameras, the following is established:

$$Z \geq 0 \quad (3)$$

From the expressions (2) and (3), the following is established:

$$d \geq 0 \quad (4)$$

Further, in light of the fact that the three-dimensional object exists on or above the reference plane $Y=Y_0$, the following can be established:

$$Y \leq Y_0 \quad (5)$$

From the expressions (5) and (2), the following is established:

$$y \leq \frac{Y_0}{2B}d \quad (6)$$

Figure 7:
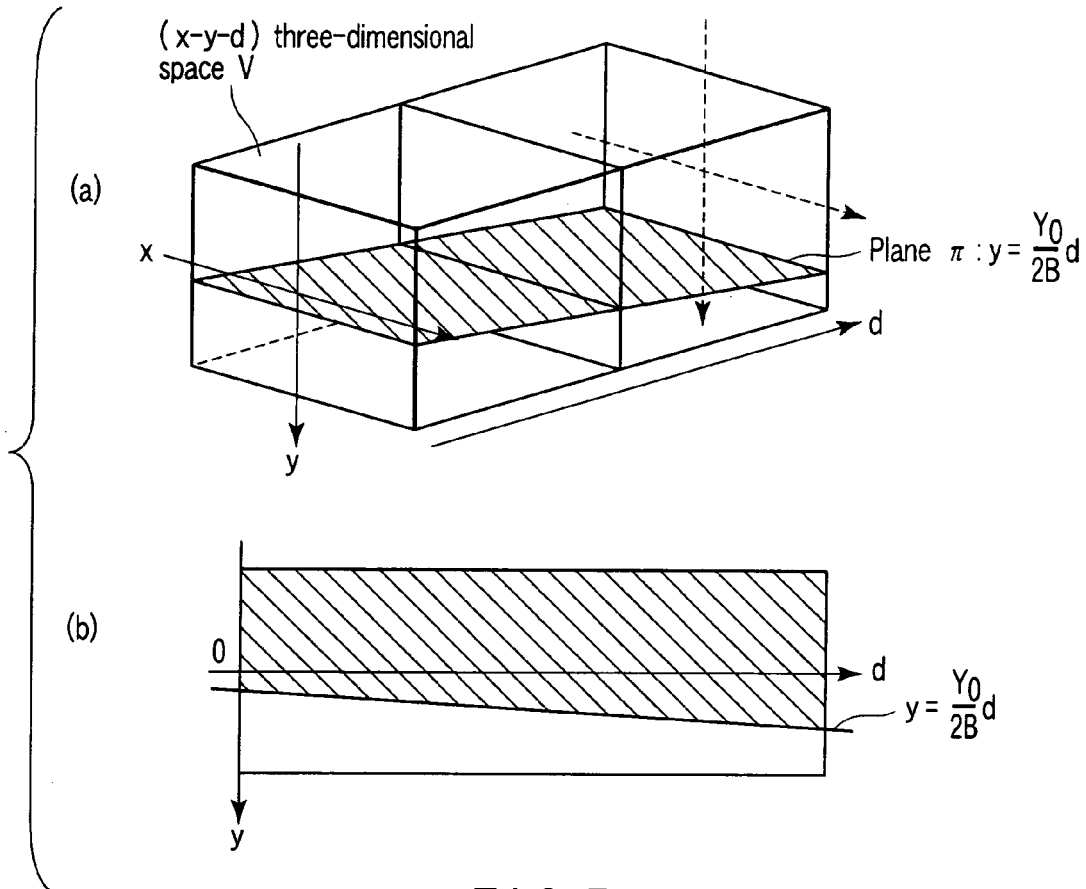
FIG. 7 is a view illustrating (x-y-d) three-dimensional space V and parallax search range employed in the first embodiment.

The space indicated by the above expression (6) corresponds to the upper portion of the space shown in FIG. 7A. FIG. 7A shows (x-y-d) three-dimensional space V formed of projection points (x, y) and parallax candidates d on a reference image. This space is divided into upper and lower spaces by plane π: $y=Y_0d/2B$. The upper space indicated by expression (6) is the space where the camera exists. FIG. 7B is a cross section of (x-y-d) three-dimensional space V taken along the (y-d) plane in FIG. 7A. In FIG. 7B, the hatched portion satisfies expression (6).

The region, which is included in (x-y-d) three-dimensional space V and does not satisfy equation (6), indicates a space below the reference plane and corresponds to a real space in which a floor, road, etc. are included, i.e., no objects exist. Therefore, this space can be excluded from the parallax search space. In contrast, the region, which is included in (x-y-d) three-dimensional space V and satisfies equation (6), indicates a space on and above the reference plane and corresponds to a real space in which objects exist. Therefore, the upper space is set as the parallax search space.

The search space computing unit 103 supplies the parallax computing unit 104 with parallax search space information determined as the above.

In the parallax computing unit 104, firstly, the similarity computing unit 104a computes, in relation to each of all parallax candidates d, the degree of similarity between a projected point (x, y) on the reference image, and a projected point (x', y') on the other image corresponding to the projected point (x, y) (step S104).

The parallax candidate d is determined by dividing, by an appropriate interval Δd, the parallax candidate width ranging from d=0 (i.e., no parallax) to a preset maximum parallax level dMax. When Δd is set to a low value, a detailed parallax search is enabled. If Δd is set to 1, the parallax can be determined in units of pixels.

Assume here that a normalized cross-correlation is utilized to detect the degree of similarity. Concerning the normalized cross-correlation, see, for example, Asada "Understanding of Dynamic Scene", pp. 12-14, published by the Institute of Electronics, Information and Communications Engineering. A description will now be given of a method for computing, using the normalized cross-correlation, the degree of similarity between a projected point (x, y) on the reference image, and the corresponding projected point (x', y') on the other image.

Figure 8:
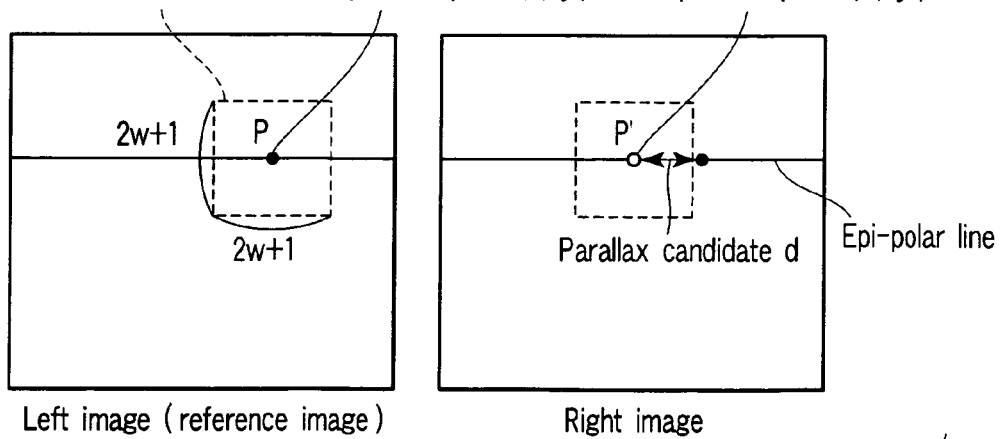
FIG. 8 is a view illustrating windows used to compute the degree of similarity in the first embodiment.

Firstly, as shown in FIG. 8, consideration will be given to a window with a size of (2w+1)×(2w+1) including the projected point P (x, y) on the reference image as the center of the window, and another window of the same size including the projected point P' (x', y') on the other image as the center of the window. In this case, assume that the brightness of the pixel at the projected point P (x, y) on the reference image is set to f (x, y), and the brightness of the pixel at the projected point P' (x', y') on the other image is set to g (x', y'). In this case, since d=x−x' and y=y', a normalized cross-correlation C (x, y, d) is given by the following equation:

$$C(x, y, d) = \frac{1}{N} \times \frac{1}{\sigma_1 \sigma_2} \quad (7)$$

$$\sum_{\eta=-w}^{w}\sum_{\xi=-w}^{w}\left\{f(x+\xi, y+\eta)-\frac{S_1}{N}\right\} \times \left\{g(x-d+\xi, y+\eta)-\frac{S_2}{N}\right\}$$

where N is the number of pixels in each window, and N=(2w+1)². Further, $\sigma_1$ and $\sigma_2$ are variances in pixel brightness in the respective windows, and are given by the following equations:

$$\sigma_1^2 = \sum_{\eta=-w}^{w}\sum_{\xi=-w}^{w}\left\{f(x+\xi, y+\eta)-\frac{S_1}{N}\right\}^2 \quad (8)$$

$$\sigma_2^2 = \sum_{\eta=-w}^{w}\sum_{\xi=-w}^{w}\left\{g(x-d+\xi, y+\eta)-\frac{S_2}{N}\right\}^2$$

If $S_1$, $S_2$, $S_{11}$, $S_{22}$ and $S_{12}$ are defined as in equations (9), the normalized cross-correlation C (x, y, d) as the degree of similarity is given by equation (10):

$$S_1 = \sum_{\eta=-w}^{w} \sum_{\xi=-w}^{w} f(x+\xi, y+\eta) \qquad (9)$$

$$S_2 = \sum_{\eta=-w}^{w} \sum_{\xi=-w}^{w} g(x-d+\xi, y+\eta)$$

$$S_{11} = \sum_{\eta=-w}^{w} \sum_{\xi=-w}^{w} f(x+\xi, y+\eta)^2$$

$$S_{22} = \sum_{\eta=-w}^{w} \sum_{\xi=-w}^{w} g(x-d+\xi, y+\eta)^2$$

$$S_{12} = \sum_{\eta=-w}^{w} \sum_{\xi=-w}^{w} \{f(x+\xi, y+\eta) \times g(x-d+\xi, y+\eta)\}$$

$$C(x, y, d) = \frac{N \times S_{12} - S_1 S_2}{\sqrt{(N \times S_{11} - S_1^2) \times (N \times S_{22} - S_2^2)}} \qquad (10)$$

where $S_1$ is the sum of the brightness levels f of the pixels included in each window on the reference image, $S_2$ is the sum of the brightness levels g of the pixels included in each window on the other image, $S_{11}$ is the sum of the squares of the brightness levels f of the pixels included in each window on the reference image, and $S_{12}$ is the sum of the squares of the brightness levels g of the pixels included in each window on the other image. If the similarity computing unit 104a beforehand computes $S_1$, $S_2$, $S_{11}$ and $S_{22}$ regardless of the parallax candidate d, and stores them in the memory 104c, it does not have to re-compute them each time the parallax candidate d is changed, which enables high-speed similarity computation.

On the other hand, $S_{12}$ indicates the sum of the products of the brightness levels of pairs of corresponding pixels included in windows on the reference image and the other image, therefore depends upon not only the brightness of each pixel but also the parallax candidate d.

If $S_{12}$ corresponding to a projected point (x, y) related to the parallax candidate d is set to $S_{12}$ (x, y, d), $S_{12}$ (x, y, d) is expressed, based on equations (9), by the following:

$$S_{12}(x,y,d) = M(x-w,y,d) + \ldots + M(x-1+w,y,d) + M(x+w,y,d) \qquad (11)$$

M (x, y, d) used in equation (11) is defined as follows:

$$M(x, y, d) = \sum_{\eta=-w}^{w} \{f(x, y+\eta) \times g(x-d, y+\eta)\} \qquad (12)$$

Namely, M (x, y, d) indicates the sum of the products of the brightness levels of pairs of corresponding pixels included in windows on the reference image and the other image, acquired with x fixed and y varied.

If M (x, y, d) defined by equation (12) is used, $S_{12}$ (x−1, y, d) corresponding to a projected point (x−1, y) adjacent by one pixel to the projected point (x, y) is given by $$S_{12}(x-1,y,d) = M(x-1-w,y,d) + M(x-w,y,d) + \ldots + M(x-1+w,y,d) \qquad (13)$$

Figure 9:
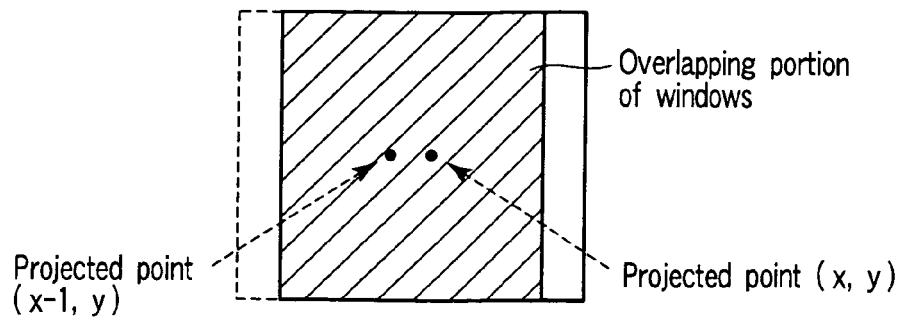
FIG. 9 is a view illustrating an overlapping state of windows used to compute the degree of similarity in the first embodiment.

From equations (11) and (13), it can be understood that the terms ranging from M (x−w, y, d) to M (x−1+w, y, d) are included in common. These common terms are derived from an overlapping portion of the windows corresponding to the projected points (x, y) and (x', y') as shown in FIG. 9.

Accordingly, if the similarity computing unit 104a stores, in the memory 104c, M (x−w, y, d) to M (x−1+w, y, d) acquired when $S_{12}$ (x−1, y, d) is computed, it can acquire $S_{12}$ (x, y, d) simply by newly calculating M (x+w, y, d) and substituting this value and the values stored in the memory 104c into equation (13). Thus, efficient computation is realized.

Further, if $S_{12}$ (x−1, y, d) is used in equation (11), $S_{12}$ (x, y, d) can also be expressed as $$S_{12}(x,y,d) = S_{12}(x-1,y,d) - M(x-1-w,y,d) + M(x+w,y,d) \qquad (14)$$

Accordingly, if the similarity computing unit 104a stores, in the memory 104c, already computed M (x−1−w, y, d) and $S_{12}$ (x−1, y, d), it can also acquire $S_{12}$ (x, y, d) simply by newly calculating M (x+w, y, d) and substituting this value and the values stored in the memory 104c into equation (14).

In addition, if the similarity computing unit 104a stores already computed M (x−w, y, d) and $S_{12}$ (x, y, d) in the memory 104c, it can acquire $S_{12}$ (x+1, y, d) corresponding to a projected point (x+1, y) adjacent by one pixel to the projected point (x, y) simply by newly calculating M (x+1+w, y, d). Further, by substituting M (x+1+w, y, d) and the values stored in the memory 104c into equation (10), the normalized cross-correlation C (x+1, y, d) corresponding to the projected point (x+1, y) related to the parallax candidate d can be acquired.

Thus, if the similarity computing unit 104a stores $S_{12}$ (x, y, d) and M (x+w, y, d) in the memory 104c whenever it computes $S_{12}$ (x, y, d), the once-computed sum of products of the brightness levels of pixels can be utilized to thereby enhance the efficiency of similarity computation.

Figure 10:
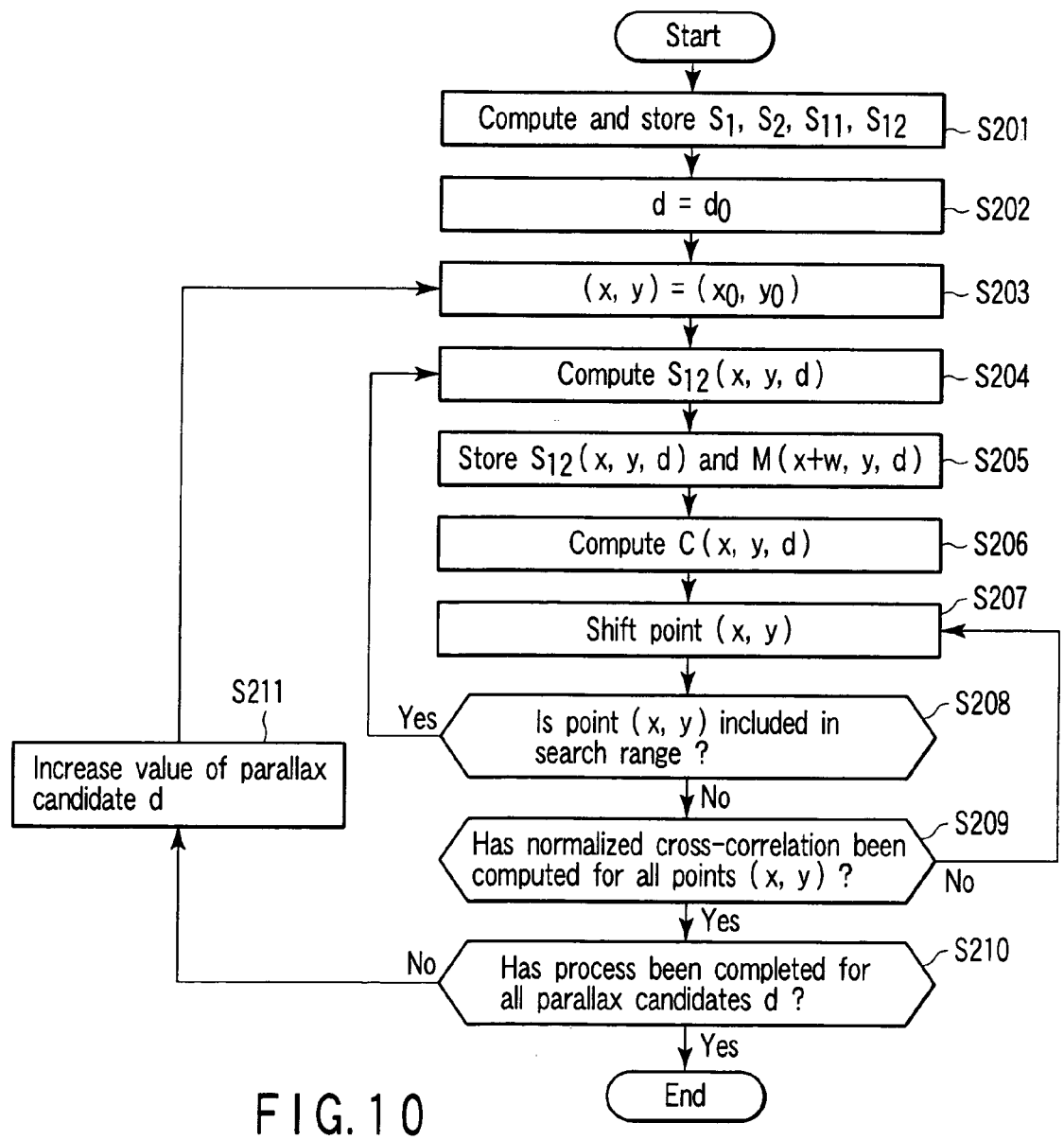
FIG. 10 is a flowchart illustrating the operation of a similarity computation section employed in the first embodiment.

Referring to the flowchart of FIG. 10, a description will be given of a method employed in the similarity computing unit 104a for efficiently acquiring the normalized cross-correlation values C (x, y, d) corresponding to all parallax candidates d.

Firstly, at step S201, $S_1$, $S_2$, $S_{11}$ and $S_{22}$ that can be acquired regardless of the parallax candidate d are computed and stored in the memory 104c.

At next step S202, a certain initial value $d_0$ (e.g., $d_0=0$) is set as the parallax candidate d.

At step S203, a certain projected point $(x, y) = (x_0, y_0)$ on the reference image is set as the initial value. For instance, (x, y)=(0, 0).

At step S204, using equation (14), $S_{12}$ (x, y, d) is computed. If $S_{12}$ (x−1, y, d) and M (x−1−w, y, d) are already stored in the memory 104c as described above, only M (x+w, y, d) is newly computed, and this value and the values stored in the memory 104c are substituted into equation (14) to acquire $S_{12}$ (x, y, d).

$S_{12}$ (x, y, d) and M (x+w, y, d) are stored in the memory 104c at step S205.

At next step S206, $S_1$, $S_2$, $S_{11}$, $S_{22}$ and $S_{12}$ (x, y, d) are substituted into equation (10) to acquire the normalized cross-correlation C (x, y, d). Thus, the once-calculated sum of the products of pixels of the windows are stored in the memory 104c and used to compute the normalized cross-correlation, resulting in an increase in the efficiency of similarity computation.

At step S207, the projected point on the reference image is shifted by one pixel from (x, y) to, for example, (x+1, y).

Figure 11:
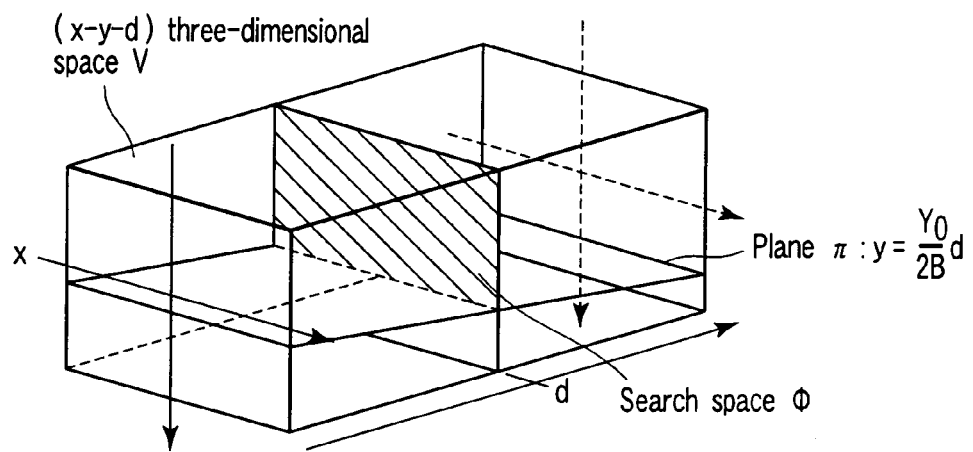
FIG. 11 is a view illustrating an example of a parallax search range employed in the first embodiment.
Figure 12:
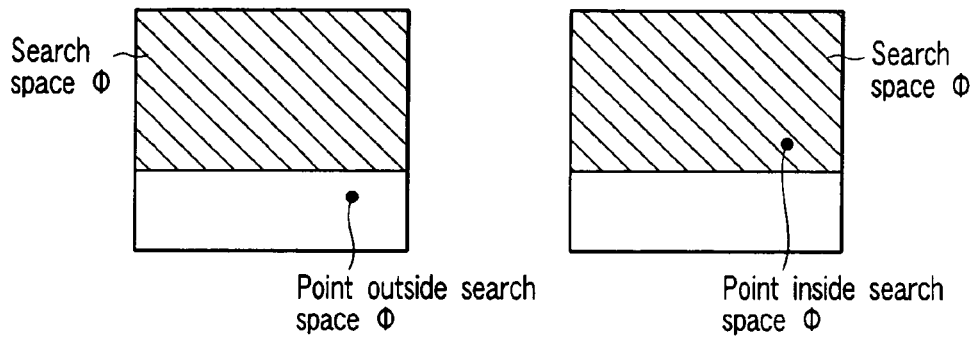
FIG. 12 is a view illustrating the relationship between the position of a projected point and the parallax search range, employed in the first embodiment.

At step S208, it is determined whether the new projected point (x+1, y) on the reference image is included in a search space that satisfies expression (6) acquired by the search space computing unit 103. Namely, if the parallax candidate is represented by d, the hatched region in FIG. 11 is a search space Φ. Therefore, if the projected point (x+1, y) on the reference image exists outside the search space Φ as shown in FIG. 12, the process proceeds to step S209. If, on the other hand, it exists within the search space Φ as shown in FIG. 12, the process returns to step S204. At step S204, the normalized cross-correlation C corresponding to a projected point on the reference image shifted by one pixel from the projected point (x+1, y) is computed. The computation steps S204 to S208 are iterated in the search space Φ in which the parallax candidate is d.

At next step S209, it is determined whether the cross-correlation values C corresponding to all projected points on the reference image have been computed in relation to the parallax candidate d. If the answer at step S209 is Yes, the process proceeds to step S210, whereas if the answer at step S209 is No, the process proceeds to step S207.

At step S210, it is determined whether processes corresponding to all parallax candidates have been completed. Namely, it is determined whether the value of the parallax candidate d reaches a preset maximum parallax candidate value dMAX. If it does not reach the maximum value dMAX, i.e., if all parallax candidates have not yet been processed, the process proceeds to step S211. In contrast, if it does reach the maximum value dMAX, i.e., if all parallax candidates have been processed, the process is finished.

At step S211, the value of the parallax candidate d is increased by one pixel (i.e., d=d+1), and the process returns to step S203. At this step, the normalized cross-correlation C between projected points corresponding to the new parallax candidate is computed in the same procedure as the above. The computation processes steps S203 to S211 are performed for all parallax candidates.

If the similarity computing unit 104a computes the normalized cross-correlation values C corresponding to all parallax candidates d in accordance with the above-described flowchart, it is not necessary, concerning adjacent projected points on the reference image, to compute in a duplicate manner the sum of products of the brightness levels of pixels in overlapping portions of windows between the reference image and the other image. As a result, highly efficient high-speed similarity computation can be realized. Further, since no similarity computation is performed for projected points outside a parallax search range on the reference image determined by the search-space computing unit 103, high-speed processing can be realized.

The parallax detection unit 104b determines a parallax D corresponding to a projected point (x, y) on the reference image, using a degree of similarity computed for the parallax candidate by the similarity computing unit 104a (step S105). It is sufficient if the parallax D corresponding to the projected point (x, y) on the reference image is set to a parallax candidate d, at which the normalized cross-correlation C (x, y, d) acquired by the similarity computing unit 104a is maximum. Namely, based on the normalized cross-correlation C (x, y, d), the parallax D can be given by the following equation:

$$D = \arg \max_{d} C(x, y, d) \qquad (15)$$

The parallax D corresponding to each projected point on the reference image and acquired by equation (15) is sent to the three-dimensional-position computing unit 105.

Based on the parallax D corresponding to each projected point on the reference image and acquired by the parallax computing unit 104, the three-dimensional-position computing unit 105 computes the position (X, Y, Z), in three-dimensional space, of an object whose image appears on the reference image (step S106). The position (X, Y, Z) in three-dimensional space can be acquired from equation (2), using the projected point (x, y) and the parallax D computed by the parallax computing unit 104.

The output unit 106 outputs the three-dimensional position of each point on the reference image, acquired by the three-dimensional-position computing unit 105 (step S107). The output unit 106 comprises, for example, a CRT display or liquid crystal display.

Thus, in the three-dimensional-information reconstructing apparatus of the first embodiment, when the degree of similarity between an arbitrary projected point on the reference image and a projected point corresponding thereto on the other image is computed, the sum of products of the brightness levels of pixels corresponding to the projected points is stored in the memory 104c. More specifically, the pixels are contained in a window on the reference image including the arbitrary projected point and in a window on the other image including the projected point that corresponds to the arbitrary projected point. The stored sum is utilized to newly compute the degree of similarity between another projected point on the reference image and a projected point on the other image corresponding thereto, which enables a high-speed parallax search.

In the first embodiment, although the normalized cross-correlation is used as the degree of similarity, the degree of similarity may be expressed as the sum $D_{sad}$ of the absolute values of the brightness differences of corresponding pixels on the reference image and the other image, which is given by $$D_{sad} = \sum_{\eta=-w}^{w} \sum_{\xi=-w}^{w} |f(x+\xi, y+\eta) - g(x-d+\xi, y+\eta)| \qquad (16)$$

Alternatively, the degree of similarity may be expressed as the sum $D_{sad}$ of the squares of the brightness differences, which is given by $$D_{ssd} = \sum_{\eta=-w}^{w} \sum_{\xi=-w}^{w} |f(x+\xi, y+\eta) - g(x-d+\xi, y+\eta)|^2 \qquad (17)$$

Also in the case of using these similarity expressions, when the degree of similarity between corresponding projected points on the reference image and the other image is computed, the sum of products of the brightness levels of pixels corresponding to the projected points is stored in the memory 104c. The stored sum is utilized to newly compute the degree of similarity between another projected point on the reference image and a projected point on the other image corresponding thereto, thereby making it unnecessary to again compute the sum of products of the brightness levels of corresponding pixels included in the overlapping portions of the windows. As a result, efficient similarity computation is realized.

Further, although in the first embodiment, cameras positioned at the right and left sides in parallel with each other are used to acquire right and left images, these images can also be acquired by a single camera. In this case, firstly, the single camera is positioned at position (−B, 0, 0) in FIG. 6 to acquire the left image (reference image), and is then positioned at position (B, 0, 0) in FIG. 6 to acquire the right image. Thus, only a single camera can provide images similar to those provided by two cameras.

Furthermore, in the first embodiment, the equation concerning the reference plane, i.e., $Y=Y_0$, is regarded as a known one. However, this equation can be acquired from images picked up, and the search range for the parallax D can be determined from the equation.

A description will now be given of an example of a method for acquiring the equation for the reference plane from images captured, in which the equation for the reference plane is calculated from two lines (e.g. white lines on a road) appearing on the reference plane on the images captured by two cameras.

Figure 13:
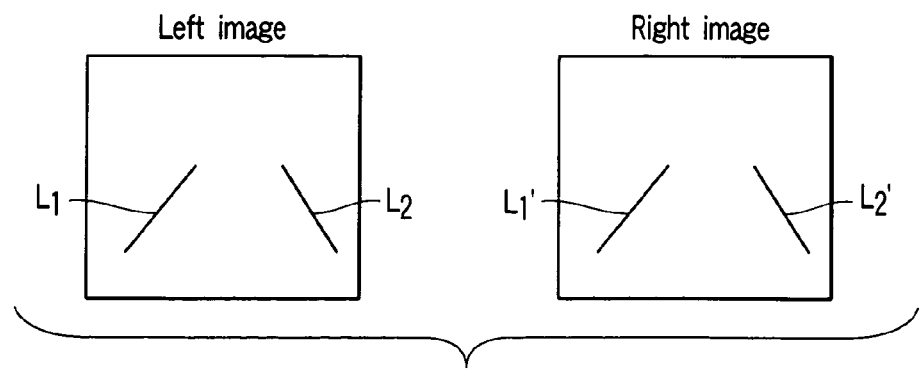
FIG. 13 is a view useful in explaining two epipolar lines appearing on a reference plane employed in the first embodiment.

As shown in FIG. 13, two lines appear on each of the right and left images. The two lines on the left image (reference image) are set as $L_1$ and $L_2$. Similarly, the two lines on the left image (the other image) are set as $L_1'$ and $L_2'$. Further, assume that equations for the lines $L_1$ and $L_1'$ on the right and left images are $x=a_1 y+b_1$ and $x'=a_1' y'+b_1'$, respectively. Where the right and left cameras are positioned in parallel with each other, the condition $y=y'$ is satisfied as in equation (1), therefore an arbitrary point on the line $L_1$ can be expressed as $(x, y)=(a_1 t+b_1, t)$, and a point on the line $L_1'$ corresponding to the arbitrary point can be expressed as $(x', y')=(a_1' t+b_1', t)$, t being an arbitrary parameter.

Using these arbitrary points and equation (1), the following equation is derived from the equation for the reference plane, i.e., $\alpha X+\beta Y+\gamma Z=1$:

$$t\{B(a_1+a_1')\alpha+2B\beta-\Delta a_1\}+B(b_1+b_1')\alpha+2BF\gamma-\Delta b_1=0 \quad (18)$$

where $\Delta a_1=a_1-a_1'$ and $\Delta b_1=b_1-b_1'$. The following equation is established regardless of the value of t:

$$B(a_1+a_1')\alpha+2B\beta-\Delta a_1=0$$

$$B(b_1+b_1')\alpha+2BF\gamma-\Delta b_1=0 \quad (19)$$

Similarly, assuming that equations for the lines $L_2$ and $L_2'$ on the right and left images are $x=a_2 y+b_2$ and $x'=a_2' y'+b_2'$, respectively, the following equations are acquired:

$$B(a_2+a_2')\alpha+2B\beta-\Delta a_2=0$$

$$B(b_2+b_2')\alpha+2BF\gamma-\Delta b_2=0 \quad (20)$$

If $\alpha$, $\beta$ and $\gamma$ are derived from equations (19) and (20), the equation for the reference plane can be acquired.

Since an object in three-dimensional space exists on or above the reference plane (i.e., in the space containing the right and left cameras), the parallax search space is given by $$\alpha X+\beta Y+\gamma Z \leq 1 \quad (21)$$

In the above-described first embodiment, the equation for the reference plane can be acquired from images captured by cameras. Therefore, even if, for example, a plurality of cameras used for capturing are moved by external vibration and hence the reference plane is always varied, the parallax search range can be accurately detected.

In addition, although in the first embodiment, the reference plane is set as a flat plane perpendicular to the Y-axis, it does not always have to be a flat plane. Even if the reference plane is a curved plane, high-speed three-dimensional information reconstruction can be realized by the same method as the above.

The three-dimensional-information reconstructing apparatus can be realized by, for example, using a versatile computer as basic hardware. Specifically, the search space computing unit 103, similarity computing unit 104a, parallax detection unit 104b and three-dimensional-position computing unit 105 can be realized by causing the processor installed in the computer to execute programs. In this case, the three-dimensional-information reconstructing apparatus may be realized by pre-installing the programs in the computer, or by storing them in a recording medium, such as a CD-ROM, and installing the stored programs in the computer, or by downloading them from a network into the computer. The image accumulation unit 102 and memory 104c can be realized by memory devices installed in the computer, external memory devices, or by storage mediums, such as CD-R, CD-RW, DVD-RAM, DVD-R, etc.

Second Embodiment

In the first embodiment, the similarity computing unit 104a computes, for each of parallax candidates, the degree of similarity between each projected point included in a search range on a reference image, and the corresponding projected point on another image. However, to detect the three-dimensional position of or to reconstruct the three-dimensional configuration of an object whose image appears in an image captured by a camera, accurate parallax detection is performed concerning the object, while rough parallax detection is performed concerning the background of the object, thereby reducing the number of computations necessary to detect parallaxes. As a result, high-speed three-dimensional information reconstruction can be realized.

Consideration is given to a case where still image data is sequentially input from a plurality of cameras to the image input unit 101, and three-dimensional information is sequentially reconstructed from the still image data. In this case, unless images acquired by the cameras include a moving object, the parallax between each projected point on one of the images (i.e., reference image) and the corresponding projected point on the other image, which are obtained from still image data picked up at each point in time, is kept constant regardless of time. Further, even if the images include a moving object, the parallax between each projected point on the reference image and the corresponding projected point on the other image, which are obtained from still image data picked up at each point in time, is not significantly varied between close points in time. This is because it is considered that the display position of the moving object is not significantly varied between continuous still images.

In light of the above, firstly, the parallax between each projected point on the reference image and the corresponding projected point on the other image is acquired, using still image data picked up at a certain time point (t). Subsequently, based on the acquired parallax, the position, in three-dimensional space, of a moving object included in the still image data is detected. After that, when the parallax between each projected point on the reference image and the corresponding projected point on the other image is acquired, using still image data picked up at the next time point (t+1), the parallax is accurately computed in a region including the moving object, which is already detected from past still image data, and the parallax in the other region is roughly computed. This enables the parallax related to the moving object to be accurately detected, and enables the number of computations for a parallax search to be reduced, with the result that high-speed reconstruction of three-dimensional information can be realized.

FIG. 14 is a block diagram illustrating the configuration of a three-dimensional-information reconstructing apparatus according to a second embodiment of the invention.

The three-dimensional-information reconstructing apparatus of the second embodiment comprises an image input unit 201, image accumulation unit 202, search space computing unit 203, search estimation value computing unit 204, parallax computing unit 205, three-dimensional-position computing unit 206, output unit 207, etc. The parallax computing unit 205 includes a similarity computing unit 205a, parallax detection unit 205b and memory 205c.

The search estimation value computing unit 204 has a function for detecting the position of an object based on a parallax previously acquired by the parallax computing unit 205, and determining an estimation value (the accuracy degree of the parallax search) for a parallax search based on the detected position. The other elements of the second embodiment are similar to the elements of the first embodiment, therefore no description is given thereof.

Referring to FIG. 14, a description will be given of the operation of the three-dimensional-information reconstructing apparatus of the second embodiment. Since the search space computing unit 203, three-dimensional-position computing unit 206 and output unit 207 operate in the same manner as the corresponding elements of the first embodiment, no description will be given of their operations.

Firstly, the image input unit 201 captures an object in three-dimensional space at regular time intervals, using two cameras, i.e., right and left cameras, and sends resultant images of the object to the image accumulation unit 202.

The images from the image input unit 201 are stored as time-series data in the image accumulation unit 202.

The search estimation value computing unit 204 detects the position of the object based on the parallax previously computed by the parallax computing unit 205, and determines an estimation value for a parallax search based on the detected position. Referring now to FIGS. 15 to 18, a method for determining an estimation value for a parallax search from a previously computed parallax will be described. For facilitating the description, assume that the two cameras capture a pedestrian walking obliquely as shown in FIG. 15.

Figure 17:
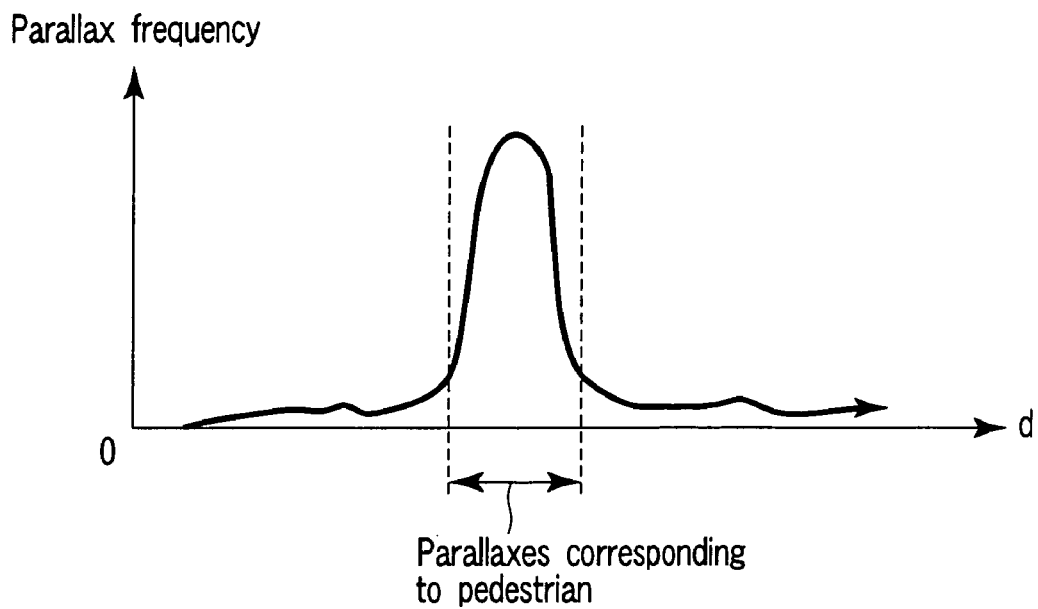
FIG. 17 is a graph illustrating an example of a parallax frequency distribution in the second embodiment.

When the right and left cameras positioned in parallel with each other capture an object in three-dimensional space as shown in FIG. 15, two points (X, Y, Z) and (X, Y+ΔY, Z) in the three-dimensional coordinates are identical in parallax on the right and left images, as is shown in FIG. 16. Accordingly, when a pedestrian is standing perpendicularly to the Y-Z plane as shown in FIG. 15, the parallax between a certain projected point on an image (i.e., reference image) captured by one camera and the corresponding projected point on an image captured by the other camera is considered to be substantially identical to the parallax between another projected point on the reference image and the corresponding projected point on the other image. Therefore, when a parallax search is executed on an image including the pedestrian, many particular parallaxes corresponding to the pedestrian are to be detected. FIG. 17 shows a parallax frequency distribution corresponding to all projected points on the reference image, acquired at the certain time point (t). In FIG. 17, the parallax frequency corresponding to the pedestrian is high. From this parallax frequency distribution, it can be understood that the pedestrian exists at the position corresponding to the high parallax frequency.

In light of the above, when a parallax search is executed on a still image picked up at the next time point (t+1), an accurate parallax search is executed concerning parallax candidates of high frequencies, and a rough parallax search is executed concerning the other parallax candidates, utilizing the parallax frequency distribution acquired at the previous time point (t). This enables accurate parallax detection to be realized in the region in which the pedestrian exists, with the number of computations for the parallax search reduced.

Figure 18:
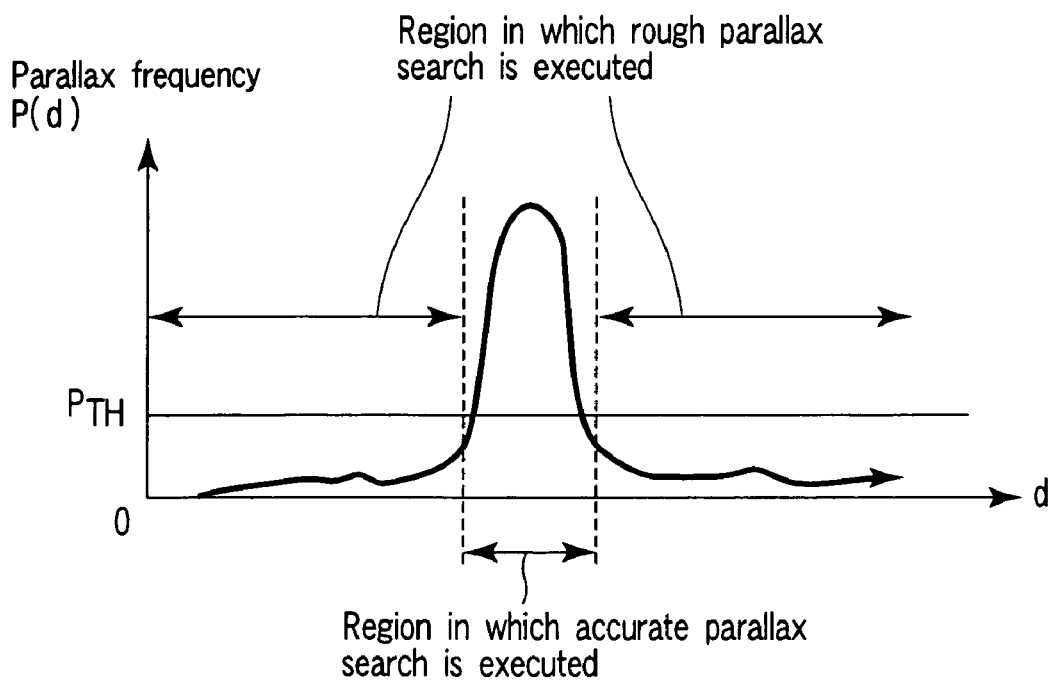
FIG. 18 is a graph illustrating the relationship between the parallax frequency distribution and the parallax search estimation value.

More specifically, firstly, a parallax frequency distribution is determined from parallaxes corresponding to all projected points on the reference image acquired at the previous time point (t). Assume here that the frequency of a parallax d is set as P(d). Further, an appropriate threshold value $P_{TH}$ is set for the parallax frequency P(d) as shown in FIG. 18. In the range that satisfies the following expression (22), a rough parallax computation is performed, while in the other region, an accurate parallax computation is performed.

$$P(d) \leq P_{TH} \tag{22}$$

The thus-obtained estimation value information for a parallax search is sent to the parallax computing unit 205. Specifically, it is determined whether each parallax candidate d satisfies expression (22). If each parallax candidate d satisfies expression (22), data "1" is sent to the parallax computing unit 205, whereas if it does not satisfy expression (22), data "0" is sent to the unit 205.

Figure 19:
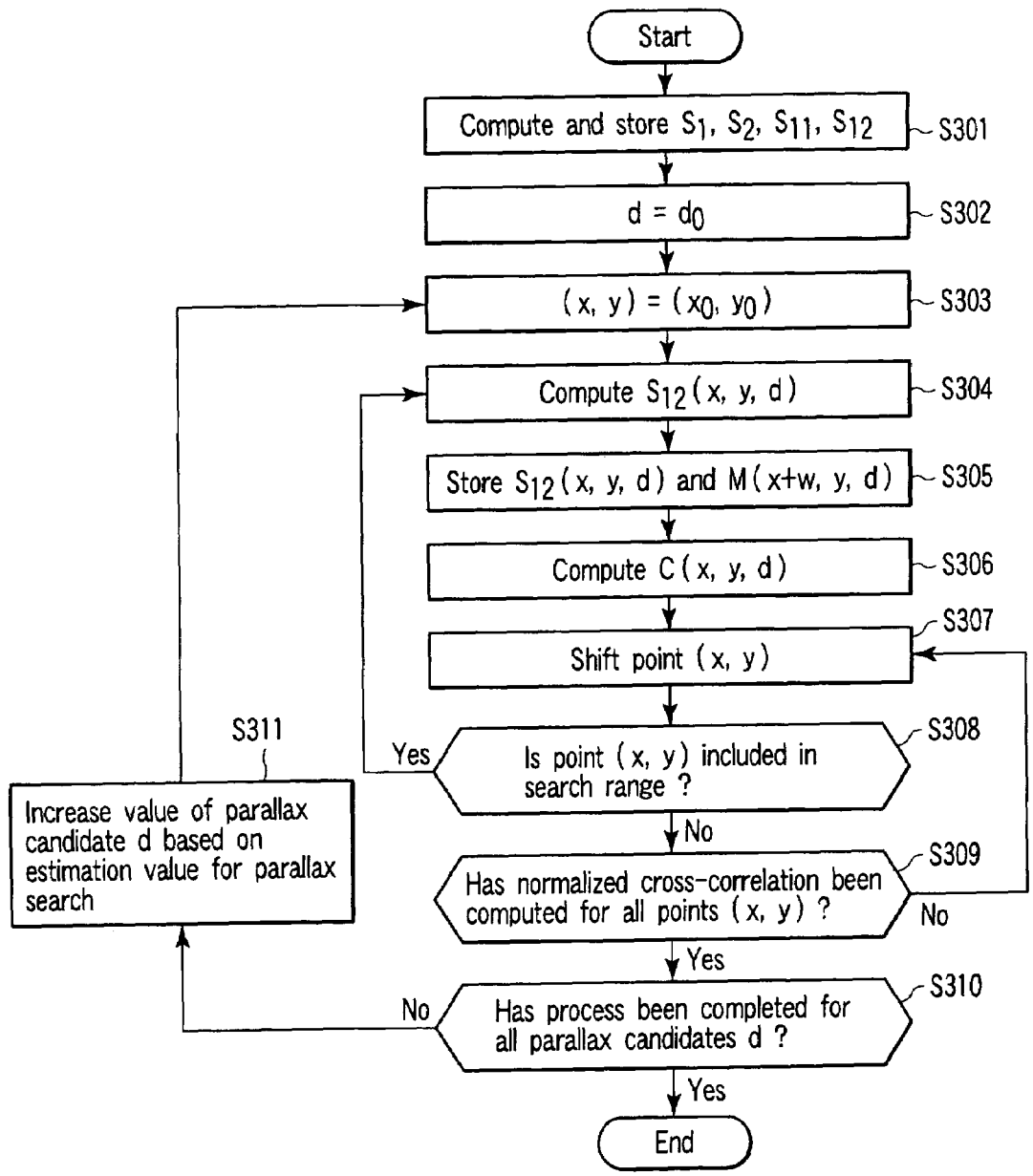
FIG. 19 is a flowchart illustrating the operation of a similarity computation section employed in the second embodiment.

In the parallax computing unit 205, firstly, the similarity computing unit 205a computes, in relation to each parallax candidate d, the degree of similarity between a projected point (x, y) on the reference image, and the corresponding projected point (x', y') on the other image. Referring now to the flowchart of FIG. 19, a description will be given of a method employed in the similarity computing unit 205a for computing the degree of similarity based on an estimation value K for a parallax search determined by the parallax estimation value computing unit 204. In this method, assume that the above-described normalized cross-correlation C is used as the degree of similarity. Note that the flowchart of FIG. 19 differs from that of FIG. 10 employed in the first embodiment in that, in the former, at step S311, the value of the parallax candidate d is reduced or increased based on the estimation value K for a parallax search. In the description below, the steps used in common between the flowcharts of FIGS. 10 and 19, i.e., steps S301 to S310, are omitted.

At step S311, the estimation value K for searching for the parallax candidate d is checked. If the estimation value K for searching for the parallax candidate d sent from the search estimation value computing unit 204 is "0", this means that it is necessary to perform an accurate search, and hence d is increased by one pixel (d=d+1). In contrast, if the estimation value K sent from the search estimation value computing unit 204 is "1", this means that it is sufficient if a rough search is performed, and hence d is increased by N pixels (d=d+N). In this state, the normalized cross-correlation C between corresponding projected points is computed in the same manner as previously mentioned. The steps S303 to S311 are executed for all parallax candidates in accordance with the estimation value K for a parallax search.

As described above, the search estimation value computing unit 204 performs an accurate parallax search for parallax candidates corresponding to points in three-dimensional space at which it is very possible that an object exists, and performs a rough parallax search for the other parallax candidates. As a result, the number of computations required for parallax search can be reduced.

Thereafter, the parallax detection unit 205b determines a parallax corresponding to each projected point on the reference image, using a degree of similarity corresponding to each parallax candidate and acquired by the similarity computing unit 205a. The parallax D corresponding to a projected point (x, y) on the reference image is determined to be a parallax candidate d at which the normalized cross-correlation C (x, y, d) acquired by the similarity computing unit 205a is maximum. Namely, based on the normalized cross-correlation C (x, y, d), the parallax D is given by equation (15). It is sufficient if this computation is executed only on the parallax candidates searched for by the similarity computing unit 205a.

The parallax computing unit 205 operates as described above. The newest parallax information acquired by the parallax computing unit 205 is sent to the three-dimensional-position computing unit 206 and search estimation value computing unit 204.

As described above, in the three-dimensional-information reconstructing apparatus of the second embodiment, an accurate parallax search is performed in a region at and near the position of an object detected by past still image data, while a rough parallax search is performed in the other region. As a result, parallaxes corresponding to the object are detected accurately with the number of required computations reduced, resulting in the realization of high-speed three-dimensional-information reconstruction.

Third Embodiment

In the first embodiment, the similarity computing unit 104a computes the degree of similarity between a projected point (x, y) on the reference image and the corresponding projected point (x', y') on the other image, by computing the normalized cross-correlation C (x, y, d) between a window of a predetermined size including the projected point (x, y), and a window of the same size including the corresponding projected point (x', y').

To accurately detect the projected point (x', y') on the other image corresponding to the projected point (x, y) on the reference image, it is desirable to use larger windows since they enable corresponding projected points to be detected based on a greater amount of data. However, if the windows contain a large number of regions having different parallaxes, erroneous correspondence of projected points may well occur. Therefore, it is desirable to set a window of an appropriate size for each projected point. For example, it would be advisable to set a large window in a flat image region, and set a small window in an uneven image region.

In light of this, in the third embodiment, in units of projected points on the reference image, the size of the window is determined based on variation in brightness between pixels contained in a certain range defined with respect to each projected point on the reference image, and the degree of similarity corresponding to each projected point on the reference image is determined using the window.

FIG. 20 is a block diagram illustrating the configuration of a three-dimensional-information reconstructing apparatus according to the third embodiment. The three-dimensional-information reconstructing apparatus of the third embodiment comprises an image input unit 301, image accumulation unit 302, search space computing unit 303, window determination unit 304, parallax computing unit 305, three-dimensional-position computing unit 306 and output unit 307, etc. The parallax computing unit 305 comprises a similarity computing unit 305a, parallax detection unit 305b and memory 305c.

In short, the third embodiment differs from the first embodiment in that the former further comprises the window determination unit 304. No description will be given of the elements in the third embodiment, which perform the same operations as those of the elements in the first embodiment, i.e., image input unit 301, image accumulation unit 302, search space computing unit 303, three-dimensional-position computing unit 306 and output unit 307.

Referring to FIGS. 20 and 21, the operation of the three-dimensional-information reconstructing apparatus of the third embodiment will be described. FIG. 21 is a flowchart illustrating the operation of the apparatus.

The window determination unit 304 determines the size of a window at step S404. This window is used to compute the degree-of-similarity C (x, y, d) between a projected point (x, y) on the reference image and the corresponding projected point (x', y') on the other image, based on variation in brightness between pixels contained in a certain range defined with respect to the projected point (x, y).

The variation in brightness between pixels corresponding to a projected point (x, y) on the reference image is given as variance of pixels in a window of (2w+1)×(2w+1) including the projected point (x, y) as the center of the window, using the following equation (23):

$$\sigma(x, y)^2 = \frac{1}{N} \sum_{\eta=-w}^{w} \sum_{\xi=-w}^{w} f(x+\xi, y+\eta)^2 - \frac{S_0(x, y)^2}{N} \quad (23)$$

where N is the number of pixels in the window, and expressed by $N=(2w+1)^2$. Further, $S_0$ (x, y) is the sum of brightness levels in the window, and is given by $$S_0(x, y) = \sum_{\eta=-w}^{w} \sum_{\xi=-w}^{w} f(x+\xi, y+\eta) \quad (24)$$

Based on the brightness variation $\sigma (x, y)^2$ corresponding to a projected point (x, y) on the reference image and given by equation (23), the window determination unit 304 determines the size of the window used to compute a degree-of-similarity C (x, y, d) corresponding to the projected point (x, y). Specifically, the window size is determined by preparing windows of different sizes, and selecting an appropriate one therefrom in accordance with the width of the brightness variation $\sigma (x, y)^2$. For instance, one is selected from windows $W_1$, $W_2$ and $W_3$ ($W_1 > W_2 > W_3$), using the following expressions (25):

$$\begin{cases} W_1: & \sigma(x, y)^2 < TH_1 \\ W_2: & TH_1 \leq \sigma(x, y)^2 < TH_2 \\ W_3: & TH_2 \leq \sigma(x, y)^2 \end{cases} \quad (25)$$

where $TH_1$ and $TH_2$ are threshold values related to the preset brightness variation $\sigma (x, y)^2$.

The window determined by the window determination unit 304 for the projected point (x, y) on the reference image is sent to the parallax computing unit 305.

In the parallax computing unit 305, firstly, the similarity computing unit 305a computes, with respect to all parallax candidates d, the degree of similarity between a projected point (x, y) on the reference image and the corresponding projected point (x', y') on the other image, using the window determined by the window determination unit 304 (step S405). Subsequently, the parallax detection unit 305b determines a parallax D corresponding to each projected point on the reference image, using a degree of similarity corresponding to each parallax candidate and acquired by the similarity computing unit 305a (step S406).

As described above, in the three-dimensional-information reconstructing apparatus of the third embodiment, a window of an appropriate size is set in units of projected points on the reference image, based on brightness variation between pixels included in a certain range defined with respect to each projected point. The window is used to relate projected points on the reference image and the other image to each other. As a result, projected points are related to each other more accurately.

Fourth Embodiment

In the third embodiment, the window determination unit 304 determines the size of a window used to compute a degree-of-similarity C (x, y, d) corresponding to a projected point (x, y) on the reference image, based on brightness variation between pixels contained in a certain range defined with respect to the projected point (x, y).

In the fourth embodiment, after the parallax D is computed by the parallax computing unit 305b, the size of the window used to compute a degree-of-similarity C (x, y, d) is adjusted in units of projected points (x, y) on the reference image, based on variation in parallax D in a certain range defined with respect to each projected point (x, y). Furthermore, the adjusted window is used to re-compute the degree-of-similarity C (x, y, d). This process will be described.

Figure 22:
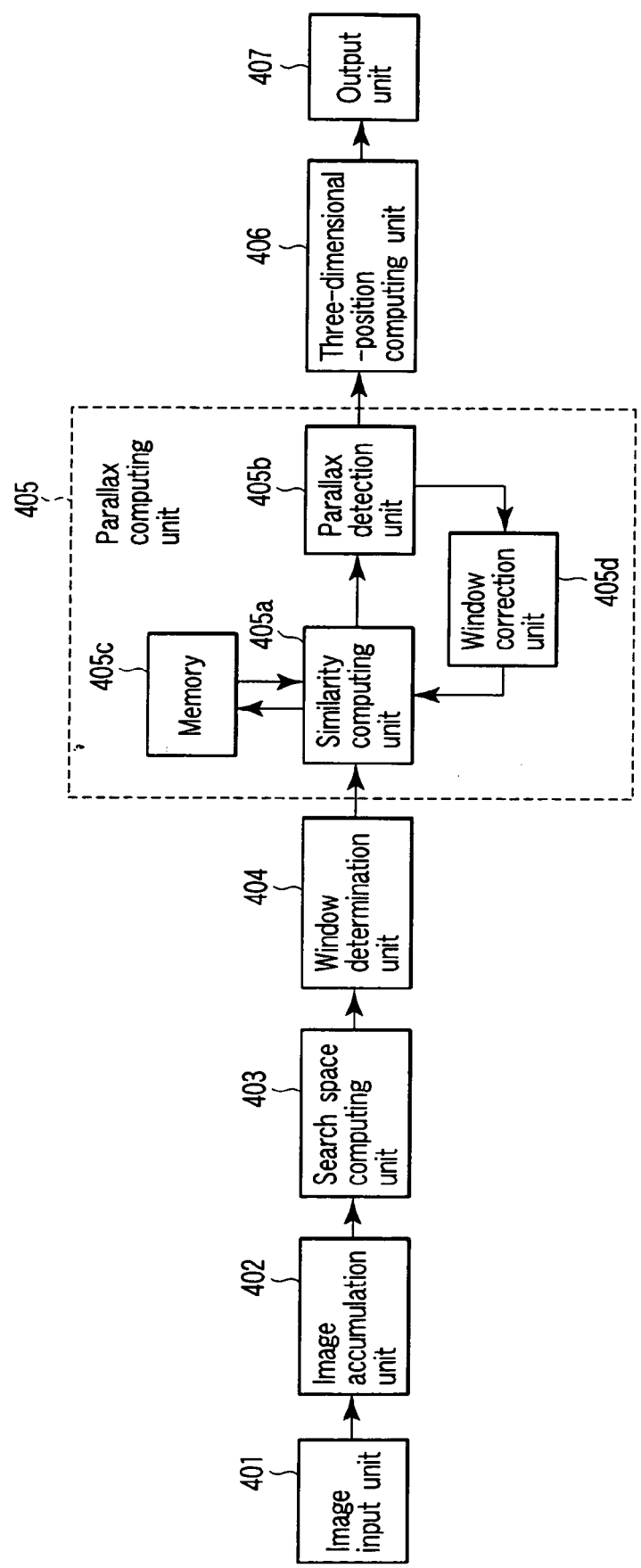
FIG. 22 is a block diagram illustrating the configuration of a three-dimensional-information reconstructing apparatus according to a fourth embodiment of the invention.

FIG. 22 is a block diagram illustrating the configuration of a three-dimensional-information reconstructing apparatus according to the fourth embodiment. The three-dimensional-information reconstructing apparatus of the fourth embodiment comprises an image input unit 401, image accumulation unit 402, search space computing unit 403, window determination unit 404, parallax computing unit 405, three-dimensional-position computing unit 406 and output unit 407, etc. The parallax computing unit 405 comprises a similarity computing unit 405a, parallax detection unit 405b, memory 405c and window adjusting unit 405d.

Namely, the fourth embodiment differs from the third embodiment in that in the former, the parallax computing unit 405 includes the window adjusting unit 405d. No description will be given of the elements in the fourth embodiment, which perform the same operations as those of the elements in the third embodiment, i.e., image input unit 401, image accumulation unit 402, search space computing unit 403, window determination unit 404, three-dimensional-position computing unit 406 and output unit 407.

Figure 23:
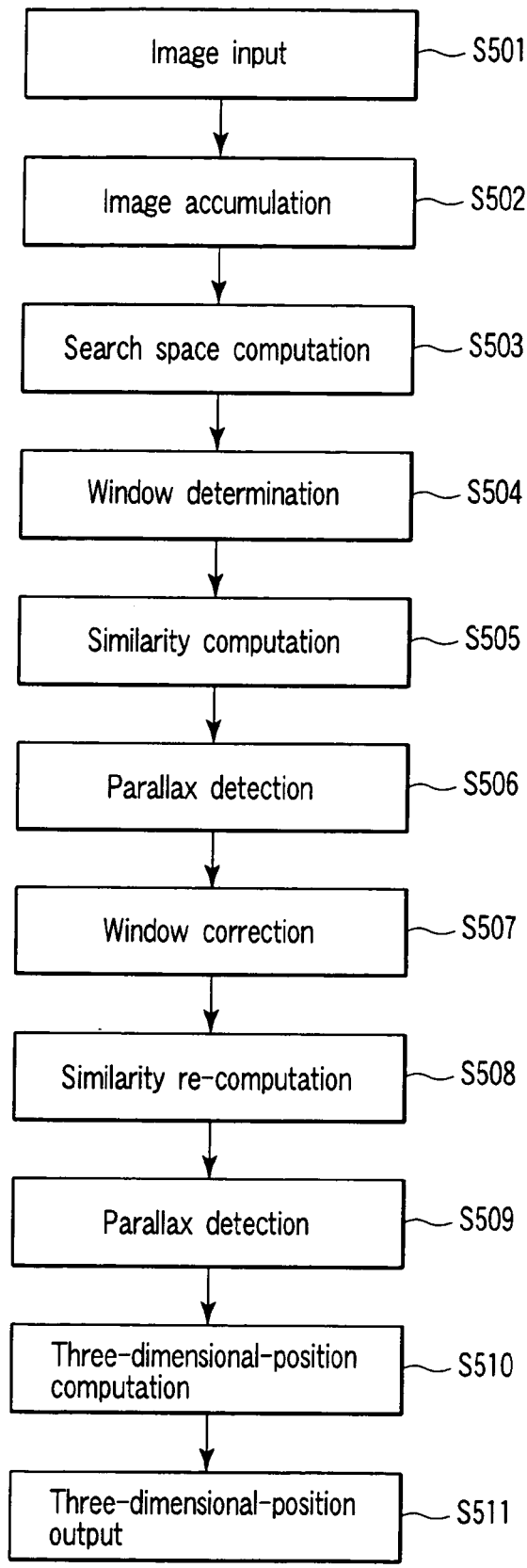
FIG. 23 is a flowchart illustrating the operation of the fourth embodiment.

Referring to FIGS. 22 and 23, the operation of the three-dimensional-information reconstructing apparatus of the fourth embodiment will be described. FIG. 23 is a flowchart illustrating the operation of the apparatus.

The parallax detection unit 405b determines a parallax D corresponding to a projected point (x, y) on the reference image, using a degree of similarity corresponding to each parallax candidate and acquired by the similarity computing unit 405a (step S506). The determined parallax candidate D corresponding to the projected point (x, y) on the reference image is sent to the window adjusting unit 405d.

The window adjusting unit 405d adjusts the size of the window used to compute a degree-of-similarity C (x, y, d) corresponding to a projected point (x, y) on the reference image, based on the parallax D (x, y) corresponding to the projected point (x, y) and sent from the parallax detection unit 405b (step S507).

As described above, to accurately relate a projected point (x, y) on the reference image to a projected point (x', y') on the other image, it is sufficient if a large window is set in a flat image region in which the width of parallax variation is small, and a small window is set in an uneven image region in which the width of parallax variation is large. To this end, the window adjusting unit 405d detects parallax variation in units of projected points (x, y) on the reference image, using the parallax D (x, y) corresponding to each projected point and acquired by the parallax detection unit 405b. Based on the parallax variation, the window adjusting unit 405d adjusts the window.

Parallax variation corresponding to a projected point (x, y) on the reference image is given by the following equation (26) as variance of the parallax D (x, y) in a window of (2w+1)×(2w+1) that uses the projected point (x, y) as the center of the window:

$$\sigma_D(x, y)^2 = \frac{1}{N} \sum_{\eta=-w}^{w} \sum_{\xi=-w}^{w} D(x+\xi, y+\eta)^2 - \frac{S_D(x, y)^2}{N} \quad (26)$$

where N is the number of pixels included in the window, and $N=(2w+1)^2$. Further, $S_p$ (x, y) is the sum of parallaxes in the window, and is given by $$S_D(x, y) = \sum_{\eta=-w}^{w} \sum_{\xi=-w}^{w} D(x+\xi, y+\eta) \quad (27)$$

Based on the parallax variation $\sigma_D(x, y)^2$ corresponding to the projected point (x, y) on the reference image and acquired by equation (26), the window adjusting unit 405d determines the size of the window used to compute the degree-of-similarity C (x, y, d) corresponding to the projected point (x, y). Specifically, to determine the window size, a plurality of windows of different sizes are prepared, and an appropriate one is selected therefrom in accordance with the width of the parallax variation $\sigma_D(x, y)^2$. For instance, one is selected from windows $W_1$, $W_2$ and $W_3$ ($W_1 > W_2 > W_3$), using the following expressions (28):

$$\begin{cases} W_1: & \sigma_D(x, y)^2 < TH_{D1} \\ W_2: & TH_{D1} \leq \sigma_D(x, y)^2 < TH_{D2} \\ W_3: & TH_{D2} \leq \sigma_D(x, y)^2 \end{cases} \quad (28)$$

where $TH_1$ and $TH_2$ are threshold values related to the preset brightness variation $\sigma(x, y)^2$.

The window adjusting unit 405d sends the thus-acquired window corresponding to the projected point (x, y) on the reference image to the similarity computing unit 405a.

Using the window corresponding to the projected point (x, y) on the reference image sent from the window adjusting unit 405d, the similarity computing unit 405a re-computes, for each of parallax candidates d, the degree-of-similarity C between the projected point (x, y) on the reference image and the corresponding projected point (x', y') on the other image (step S508). The re-computation of the degree of similarity for each of parallax candidates d is executed, for example, in accordance with the flowchart of FIG. 10 as in the above-described first embodiment.

Using the degree of similarity re-computed for each of parallax candidates d by the similarity computing unit 405a, the parallax detection unit 405b re-computes the parallax D (x, y) corresponding to each projected point on the reference image (step S509). Based on the parallax D (x, y) re-computed by the parallax detection unit 405b, the three-dimensional-position computing unit 406 computes the position (X, Y, Z), in three-dimensional space, of an object whose image appears in the reference image (step S510).

As described above, in the three-dimensional-information reconstructing apparatus of the fourth embodiment, firstly, the projected points (x, y) on the reference image are appropriately related to the projected points (x', y') on the other image, using windows having a size appropriately determined from brightness variation in pixels. As a result, parallaxes corresponding to the projected points (x, y) on the reference image are acquired. Further, from the acquired parallaxes, parallax variation in a certain range defined with respect to each projected point on the reference image is detected, and a window corresponding to the certain range is adjusted based on this parallax variation. Using the thus-adjusted windows, the correspondence between the projected points (x, y) on the reference image and the projected points (x', y') on the other image is adjusted. Thus, the projected points can be made to more accurately correspond to each other.

Although in the fourth embodiment, the window adjusting unit 405*d* performs window adjustment only one time, it may again perform window adjustment based on parallaxes detected using the once-adjusted windows. Repetition of parallax detection and window adjustment enables the projected points to be made to more accurately correspond to each other, resulting in more accurate parallax detection.

Furthermore, although in the fourth embodiment, the window adjusting unit 405*d* only adjusts the size of each window, it may change the configuration of each window based on the parallaxes detected by the parallax detection unit 405*b*. In this case, for example, a plurality of windows of different sizes are prepared beforehand, and parallax variation corresponding to a projected point (x, y) on the reference image is detected in units of windows, using parallaxes acquired by the parallax detection unit 405*b*, thereby selecting the window that minimizes the width of parallax variation. For instance, if each window is expressed by $(2w_1+1) \times (2w_2+1)$, the parallax variation $\sigma_D(x, y)^2$ corresponding to a projected point (x, y) on the reference image is computed using the following equation (29), and the window that minimizes $\sigma_D(x, y)^2$ is selected as a new window:

$$\sigma_D(x, y)^2 = \frac{1}{N} \sum_{\eta=-w_2}^{w_2} \sum_{\xi=-w_1}^{w_1} D(x+\xi, y+\eta)^2 - \frac{S_D(x, y)^2}{N} \qquad (29)$$

where N is the number of pixels in the window, and expressed by $N=(2w+1)^2$. Further, $S_D(x, y)$ is the sum of parallaxes in the window, and is given by $$S_D(x, y) = \sum_{\eta=-w_2}^{w_2} \sum_{\xi=-w_1}^{w_1} D(x+\xi, y+\eta) \qquad (30)$$

Thus, the window adjusting unit 405*d* adjusts not only the window size but also the window configuration, which enables more accurate parallax detection.

Further, although in the fourth embodiment, the window adjusting unit 405*d* adjusts each window based on the parallax D (x, y) acquired by the parallax detection unit 405*b*, it may perform the following. Namely, the parallax D (x, y) is substituted into d in equation (2), thereby acquiring the three-dimensional depth Z (x, y) corresponding to a projected point (x, y) on the reference image, and adjusting the corresponding window based on variation in depth Z (x, y). Variation in depth Z (x, y) is detected by using, instead of D (x, y), the depth Z (x, y) corresponding to the projected point (x, y), in equation (26).

In addition, in the fourth embodiment, to compute the degree-of-similarity C (x, y, d) using equation (10), $S_1$ and $S_2$ are acquired by equation (9). When parallax detection is repeatedly performed while adjusting the window size and configuration, it is desirable that the re-computation of $S_1$ and $S_2$ be performed easily. To this end, the sum F (x, y) of the brightness levels f (x, y) of pixels included in a region, which is defined by origin (0, 0) and projected points (0, y), (x, 0) and (x, y) on the reference image as shown in FIG. 24, is beforehand computed using the following equation (31):

$$F(x, y) = \sum_{\eta=0}^{x} \sum_{\xi=0}^{y} f(x, y) \qquad (31)$$

To acquire, as $S_1$, the sum of the brightness levels of pixels included in regions, which are defined by projected points $(x_1, y_1)$, $(x_1, y_2)$, $(x_2, y_1)$ and $(x_2, y_2)$ on the reference image as shown in FIG. 25, it is computed using the beforehand acquired F (x, y) and the following equation (32):

$$S_1 = F(x_2, y_2) + F(x_1, y_1) - F(x_1, y_2) - F(x_2, y_1) \qquad (32)$$

Thus, if F (x, y) corresponding to each projected point on the reference image is beforehand computed and stored, the sum $S_1$ of the brightness levels of pixels included in an arbitrary region on the reference image can be easily computed. This can reduce the number of computations necessary to compute the degree-of-similarity C (x, y, d) while adjusting the window size or configuration. The same can be said of $S_2$.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional-information reconstructing apparatus comprising:

a camera that captures an object in a three-dimensional space to acquire a first image of the object and a second image of the object;

a search range computing unit configured to compute, based on a geometrical relationship between the object and a reference plane in the three-dimensional space, a parallax search range in a (x-y-d) three-dimensional space formed of three variables, the three variables being an x value and a y value providing a first point (x, y) on the first image and a selected parallax candidate d, the parallax search range being on an epipolar line and a space on and above the reference plane and corresponding to a real space in which the object exists;

a similarity estimator which estimates, for each of parallax candidates in the parallax search range, a degree-of-similarity C (x, y, d) between the first point (x, y) and a second point (x', y') on the second image, the second point (x', y') corresponding to the first point (x, y), the degree-of-similarity C (x, y, d) being based on a sum of products of brightness levels of corresponding pixel pairs between a first window on the first image and a second window on the second image, the first window including the first point (x, y), the second window including the second point (x', y') and having a size identical to a size of the first window;

a parallax computing unit configured to compute a parallax D between the first point (x, y) on the first image and the second point (x', y') on the second image, based on the degree-of-similarity C (x, y, d); and a window adjusting unit configured to adjust at least one of the size and a configuration of the first window and the second window, used for computing the degree-of-similarity C (x, y, d), in units of first points (x, y) on the first image, based on the computed parallax D, and wherein the similarity estimator re-computes the degree-of-similarity C (x, y, d) using the adjusted windows, wherein the similarity estimator includes a storage unit configured to store the sum, the stored sum being used for computing a degree-of-similarity C (x, y, d) between a new first point on the first image and a new second point on the second image corresponding to the new first point.

2. The apparatus according to claim 1, wherein the search range computing unit sets, as the parallax search range, a space included in two spaces and containing the object, the two spaces being formed by dividing the (x-y-d) three-dimensional space along the reference plane.

3. The apparatus according to claim 1, wherein the search range computing unit computes an equation of the reference plane, based on a feature of the reference plane in the first image and the second image, and determines the parallax search range using the computed equation.

4. The apparatus according to claim 1, wherein the parallax computing unit computes, as the parallax D, the parallax candidate d when the parallax candidate d maximizes the degree-of-similarity C (x, y, d).

5. The apparatus according to claim 1, further comprising:

a search accuracy computing unit configured to compute accuracy of a parallax search in the (x-y-d) three-dimensional space, based on three-dimensional information reconstructed from the first image and the second image.

6. The apparatus according to claim 1, wherein the degree-of-similarity C (x, y, d) is obtained by a normalized cross-correlation between the first window and the second window.

7. The apparatus according to claim 1, wherein the degree-of-similarity C (x, y, d) is obtained by a sum of absolute values of differences in brightness between corresponding pixel pairs between the first window and the second window.

8. The apparatus according to claim 1, wherein the degree-of-similarity C (x, y, d) is obtained by a sum of squares of differences in brightness between corresponding pixel pairs between the first window and the second window.

9. The apparatus according to claim 1, wherein the window adjusting unit adjusts at least one of the size and a configuration of the first window and the second window in units of first points (x, y) on the first image, based on variation in the parallax D between first points included in a certain range defined on the first image with respect to each of the first points (x, y).

10. The apparatus according to claim 1, wherein the window adjusting unit acquires a depth in a three-dimensional space corresponding to each of first points (x, y) on the first image, based on the computed parallax D, and adjusts at least one of the size and a configuration of the first window and the second window in units of first points (x, y) on the first image, based on variation in the depth between first points included in a certain range defined on the first image with respect to each of the first point (x, y).

11. A three-dimensional-information reconstructing processor implemented method comprising:

capturing an object in a three-dimensional space to acquire a first image of the object and a second image of the object;

computing, based on a geometrical relationship between the object and a reference plane in the three-dimensional space, a parallax search range in a (x-y-d) three-dimensional space formed of three variables, the three variables being an x value and a y value providing a first point (x, y) on the first image and a selected parallax candidate d, the parallax search range being on an epipolar line and a space on and above the reference plane and corresponding to a real space in which the object exists;

estimating, for each of parallax candidates in the parallax search range, a degree-of-similarity C (x, y, d) between the first point (x, y) and a second point (x', y') corresponding to the first point (x, y), the degree-of-similarity C (x, y, d) being based on a sum of products of brightness levels of corresponding pixel pairs between a first window on the first image and a second window on the second image, the first window including the first point (x, y), the second window including the second point (x', y') and having a size identical to a size of the first window;

computing a parallax D between the first point (x, y) on the first image and the second point (x', y') on the second image, based on the degree-of-similarity C (x, y, d); and adjusting at least one of the size and a configuration of the first window and the second window, used for computing the degree-of-similarity C (x, y, d), in units of first points (x, y) on the first image, based on the computed parallax D, and wherein the similarity estimator re-computes the degree-of-similarity C (x, y, d) using the adjusted windows, wherein computing the degree-of-similarity includes storing the sum, the stored sum being used for computing a degree-of-similarity C (x, y, d) between a new first point on the first image and a new second point on the second image corresponding to the new first point.

12. A three-dimensional-information reconstructing program stored in a medium which is read by a computer, the program comprising instructions of:

capturing an object in a three-dimensional space to acquire a first image of the object and second image of the object;

computing, based on a geometrical relationship between the object and a reference plane in the three-dimensional space, a parallax search range in a (x-y-d) three-dimensional space formed of three variables, the three variables being an x value and a y value providing a first point (x, y) on the first image and a selected parallax candidate d, the parallax search range being on an epipolar line and a space on and above the reference plane and corresponding to a real space in which the object exists;

estimating, for each of parallax candidates in the parallax search range, a degree-of-similarity C (x, y, d) between the first point (x, y) and a second point (x', y') on the second image, the second point (x', y') corresponding to the first point (x, y), the degree-of-similarity C (x, y, d) being based on a sum of products of brightness levels of corresponding pixel pairs between a first window on the first image and a second window on the second image, the first window including first point (x, y), the second window including the second point (x', y') and having a size identical to a size of the first window;

computing a parallax D between the first point (x, y) on the first image and the second point (x', y') on the second image, based on the degree-of-similarity C (x, y, d); and adjusting at least one of the size and a configuration of the first window and the second window, used for computing the degree-of-similarity C (x, y, d), in units of first points (x, y) on the first image, based on the computed parallax D, and wherein the similarity estimator re-computes the degree-of-similarity C (x, y, d) using the adjusted windows, wherein the degree-of-similarity computing instruction includes an instruction of instructing the computer to store the sum, the stored sum being used for computing a degree-of-similarity C (x, y, d) between a new first point on the first image and a new second point on the second image corresponding to the new first point.

* * * * *